United States Patent [19]

Hessler et al.

[11] Patent Number: 4,652,052
[45] Date of Patent: Mar. 24, 1987

[54] MEMORY SEAT ASSEMBLY

[75] Inventors: Alfred Hessler; Andrzej Bartczak, both of Markham, Canada

[73] Assignee: Magna International Inc., Markham, Canada

[21] Appl. No.: 727,002

[22] Filed: Apr. 24, 1985

[51] Int. Cl.[4] .............................................. B60N 1/04
[52] U.S. Cl. ..................................... 297/341; 248/430
[58] Field of Search ................. 297/341; 248/429, 430

[56] References Cited

U.S. PATENT DOCUMENTS

| | | | |
|---|---|---|---|
| 3,940,182 | 2/1976 | Tamura | 297/341 |
| 4,143,911 | 3/1979 | Sakakibara et al. | 297/341 |
| 4,159,147 | 6/1979 | Kiyomitsu et al. | 297/341 |
| 4,378,927 | 4/1983 | Graves | 248/430 X |
| 4,440,442 | 4/1984 | Drouillard et al. | 297/341 |

FOREIGN PATENT DOCUMENTS

| | | | |
|---|---|---|---|
| 2724048 | 12/1978 | Fed. Rep. of Germany | 297/341 |
| 13220 | 2/1977 | Japan | 297/341 |
| 31424 | 3/1977 | Japan | 297/341 |
| 91427 | 7/1980 | Japan | 297/341 |

Primary Examiner—Francis K. Zugel
Assistant Examiner—Peter R. Brown
Attorney, Agent, or Firm—James D. Fornari; Ivor M. Hughes

[57] ABSTRACT

A seat assembly especially suitable for use as a front seat of a two door vehicle. The seat assembly is slidable on tracks for permitting ease of access to behind the seat, and is provided with a front and rear end comprising three track assemblies, a fixed lower track assembly, a middle or second track assembly releaseably secured to the lower track assembly, and when released, being slideable to the front end with respect to the lower track assembly, and an upper or third track assembly releaseably secured to the middle track assembly, and when released, being slideable to the front end with respect to the middle track assembly. The seat assembly includes a "memory" for returning the slideable set assembly to its initial position.

9 Claims, 31 Drawing Figures

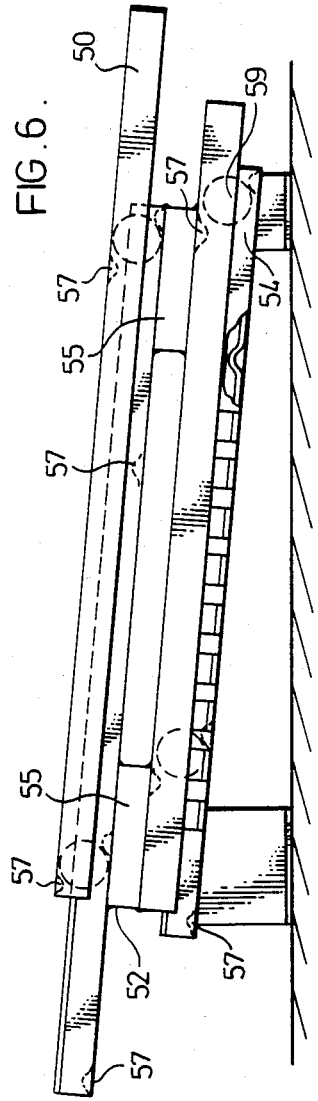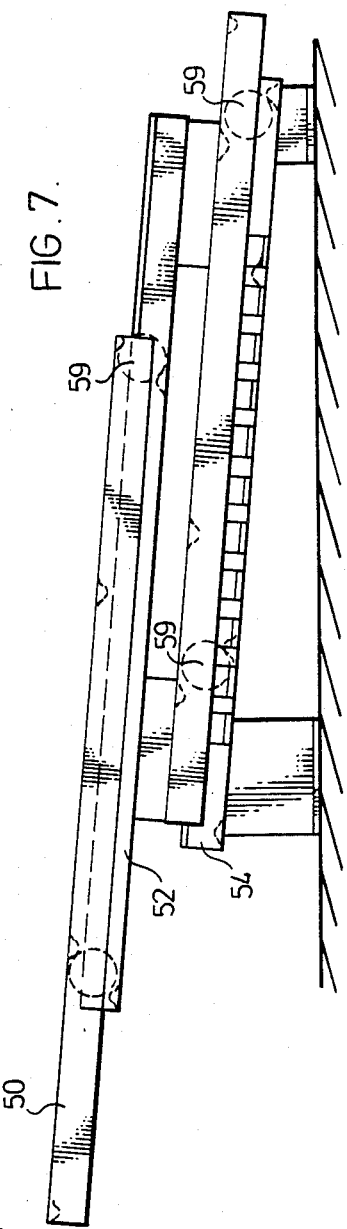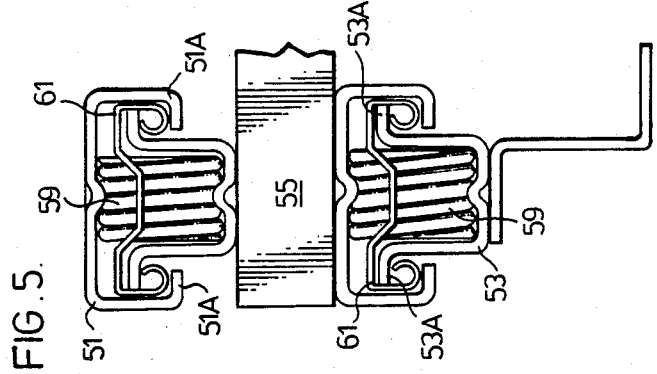

MEMORY SEAT ASSEMBLY

FIELD OF INVENTION

This invention relates to a seat assembly especially suitable for use as a front seat of a two door vehicle. In that regard, the seat assembly is slidable on tracks for permitting ease of access to behind the seat, and includes a "memory", for returning the slidable seat assembly to its initial position.

BACKGROUND OF THE INVENTION

Automobiles have recently been down sized to reduce their cost and fuel consumption. While this downsizing has in part achieved the above objectives, such achievement has not been without drawbacks. With the downsizing, came smaller doors, smaller bodies and smaller openings between the back of the tiltable front seat in the two door models and the back seat thus providing only reduced access to behind the seat and particularly to the back seat. By the tilting alone, sufficient space is not provided without sliding the front seat forward. In this regard see U.K. Patent Nos. 1,344,271 and 1,432,889. Where the front seat is released from its locked position and moved forward in an attempt to provide sufficient access to behind the seat and particularly to the back seat, it is preferable that the front seat be automatically returned to its initial position when the front seat is moved rearwardly to avoid the front seat driver or passenger having to re-adjust the position of the seat after entry of a passenger behind the seat. In this regard, the prior art proposes the use of "memory devices" which each purport to mechanically "remember" the initial position of the seat when each seat is released from its locked position and moved forwardly. See published U.K. Patent Application Nos. 2,033,738; 2,091,548 and 1,459,605 and U.S. Pat. Nos. 3,940,182; 4,101,169 and 4,440,442.

U.S. Pat. No. 4,440,442 does not provide a true "memory" as such which sets itself when the seat slides forward. Rather this patent teaches the use of upper and lower vertically stacked track assemblies slidable relative to one another only one of which moves at one time and provides minimal adjustment and access.

The other patents and applications each provide a true "memory" to permit return of the seat to its initial position which position itself is adjustable relative to moveable portions of the track assemblies. By tilting the back of the front seat forward, a wire or other device may be tripped, releasing a latch and causing the "memory" to be set while the front seat is pushed forward.

However, most devices are not very reliable, comprise too many component parts, are costly to manufacture, and do not permit sufficient entry access space to the back seat.

It is therefore, an object of this invention to provide an improved assembly for the sliding movement of the front seat which maximizes access to behind the front seat and particularly to the back seat, minimizes costs for providing such entry and provides a reliable "memory" of the initial position of the front seat for reliable return to that initial position when the front seat is returned to its initial position.

It is a further object of this invention to provide such assembly which does not interfere with conventional adjustment operations and positioning of the seat.

Further and other objects of the invention will be realized by those skilled in the art from the following summary of the invention and detailed description of an embodiment of the invention.

SUMMARY OF THE INVENTION

According to this invention, a seat assembly having a front and rear end is provided comprising at least three track (rail) assemblies preferably three track (rail) assemblies, a fixed lower track (rail) assembly, middle track (rail) assemblies preferably one middle or second track (rail) assembly releasably secured to the fixed lower track (rail) assembly and when released, being slidable with respect to the lower track assembly and an upper track (rail) assembly releaseably secured to the middle track (rail) assemblies (assembly) and thus the lower track (rail) assembly and when released being slidable with respect to the middle track assemblies (assembly) and thus the lower track assembly -including a first latch mechanism secured to the upper track assembly pivotally releaseably secured to the middle or second track assembly mechanisms for releasably securing the upper track (rail) assembly to the middle track (rail) assemblies (assembly) and a second latch mechanism secured to the middle track assembly pivotally releaseably secured to the lower track assembly for releaseably securing the middle track (rail) assemblies (assembly) to the lower track assembly the first latch mechanism being disposed closer the rear end of the seat assembly than the second latch mechanism when the latch mechanisms are releaseably secured to the middle and lower track assemblies respectively, the first latch mechanism carrying means for engaging the second latch mechanism to release it from securement to the lower track assembly when the upper track assembly is released and moves away from the rear end of the seat assembly, means on the latch mechanism to be engaged by means carried on the first latch mechanism to cause the second latch mechanism to pivot to release the middle track assembly with respect to the lower track assembly, and a latch memory means for memorizing the initial position of the upper and middle track (rail) assemblies relative to the lower track (rail) assembly latch memory means secured to be longitudinally moveable relative to the fixed lower track assembly with the second latch mechanism, when the second latch mechanism is released without release of the first latch mechanism, but fixed in position relative to the fixed lower assembly for lateral pivotal movement relative to the fixed lower track assembly to engage the lower track assembly to memorize the initial position of securement of the second latch mechanism in the fixed lower track when released by the forward movement of the first latch mechanism and thus, the upper track assembly, which seat assembly permits the "sliding displacement" of the components to provide ease of access, and sufficient access, to behind the seat and particularly the back seat (even in down sized automobiles) provides a reliable "memory" for memorizing the front seat assembly's initial position prior to the front seat sliding forward and returns to its initial position irrespective of whether the upper track (rail) assembly or middle track (rail) assemblies (assembly) starts to return to the initial "stacked" or "stored" position first.

By the use of the three track (rail) assemblies, one over the other (stacked or stored) each track or rail assembly provides maximum extension and thus ease of access to, and sufficient access to the back seat.

According to the invention, the latch memory means provided is easily activated and will not readily dislodge from its "memorizing" position thus providing reliability, irrespective of which assembly returns first. According to another aspect of the invention the seat assembly further comprises means carried by the middle track assembly released for movement by, the release and movement of the upper track assembly away from the rear end of the seat assembly after release of the first latch mechanism, and, by the release of the second latch mechanism from the lower track assembly by the forward movement to the front end of the first latch mechanism to thereby preclude the second latch mechanism from securing the middle track assembly to the fixed lower track assembly, the latch memory means being thereby released for memorizing the initial position of securement of the second latch mechanism after release of the first latch mechanism when the means for precluding the second latch mechanism from securing the middle track assembly to the fixed lower track assembly is positioned when the upper and middle track assemblies are released for movement, synchronization means and delay means for precluding the latch memory means from disengaging the fixed lower track assembly until the second latch mechanism is returned to its initial position securing the middle track assembly to the lower track assembly, the synchronization means for engaging the means for precluding the second latch mechanism from securing the middle track assembly to the lower fixed track assembly and prevent such means from permitting the second latch mechanism securing the middle track assembly to the lower fixed track assembly until the synchronization means is returned to its initial position, and the delay means for engaging the latch memory means and precluding the disengagement thereof with the fixed lower track assembly until the synchronization means is returned to its initial position at which time the delay means is caused to be returned to its initial position thereby permitting the means precluding release of the second latch mechanism from securing the middle track assembly to the lower fixed track assembly to be moveable to release the second latch mechanism to secure the middle track assembly to the lower fixed track assembly.

Therefore, according to one aspect of the invention, a seat assembly is provided for permitting the front seat having a seat back and at its rear end bottom, to be moved forwardly and returned to its initial position providing ease of access and sufficient access to behind the seat assembly and particularly to the back seat, "memorizing" the seat's initial position for return of the assembly to its initial position, the said seat assembly comprising:
(a) an upper track (rail) assembly secured to a seat bottom;
(b) a middle track (rail) assembly
—and—
(c) a lower track (rail) assembly fixed to the vehicle body, the upper track (rail) assembly being releasably secured to the middle track (rail) assembly sliding with the middle track (rail) assembly and when released, being slidable with respect to the middle track (rail) assembly and the middle track (rail) assembly being releasably to the lower track (rail) assembly and when released being slidable with respect to the lower track (rail) assembly the position of securement of the middle track (rail) assembly to the lower track (rail) assembly being variable for positioning the seat bottom relative to the vehicle body; a first latch mechanism secured to the upper track assembly pivotally releaseably secured to the middle track assembly;

the seat back tiltable towards the front of the seat, the tilting of the back releasing the first latch mechanism from the middle track assembly thus releasing the upper track for slidable movement relative to the middle track a second latch mechanism secured to the middle track assembly pivotally releaseably secured to the fixed lower track assembly, the first mechanism being disposed closer the rear end of the seat assembly than the second latch mechanism when the latch mechanisms are releaseably secured to the middle and lower track assemblies respectively, the first latch mechanism carrying means for engaging the second latch mechanism to release it from securement to the lower track assembly when the upper track assembly is released and moves away from the rear end of the seat assembly, means on the second latch mechanism to be engaged by the means carried on the first latch mechanism to cause the second latch mechanism to pivot to release the middle track assembly with respect to the lower track assembly whereby when the upper track is moved forward it causes the middle track to be released for slidable forward following movement with respect to the lower track;

memory latch means secured to be longitudinally moveable relative to the fixed lower track assembly with the second latch mechanism when the second latch mechanism is released without release of the first latch mechanism fixed in position relative to the fixed lower assembly for lateral pivotal movement relative to the fixed lower track assembly to engage the lower track assembly to memorize the initial position of securement of the second latch mechanism in the fixed lower track when released by the forward movement of the first latch mechanism and thus the upper track assembly for releasably securing to the lower track assembly when the upper track (rail) assembly is released for slidable forward movement, to "memorize" the initial position of the seat assembly so that when the tracks are fully extended, the seat has been moved forwardly to a forward position to permit entry to behind the seat and means carried by the middle track assembly released for movement by, the release and movement of the upper track assembly away from the rear end of the seat assembly after release of the first latch mechanism, and, by the release of the second latch mechanism from the lower track assembly by the forward movement to the front end of the first latch mechanism to thereby preclude the second latch mechanism from securing the middle track assembly to the fixed lower track assembly, the latch memory means being thereby released for memorizing the initial position a securement of the second latch mechanism after release of the first latch mechanism when the means for precluding the second latch mechanism from securing the middle track assembly to the fixed lower track assembly is positioned when the upper and middle track assemblies are released for movement, synchronization means and delay means for precluding the latch memory means from disengaging the fixed lower track assembly until the second latch mechanism is returned to its initial position securing the middle track assembly to the lower track assembly, the synchronization means for engaging the means for precluding the second latch mechanism from securing the middle track assembly to the lower fixed track assembly and prevent such means from permitting the second latch mechanism securing the middle track assembly to the lower fixed track assembly until the synchronization means is returned to its initial position, and the delay means for engaging the latch memory means and precluding the disengagement thereof with the fixed lower track assembly until the synchronization means is returned to its initial position at which time the delay means is caused to be returned to its initial position thereby permitting the means precluding release of the second latch mechanism from securing the middle track assembly to the lower fixed track assembly to the moveable to release the second latch mechanism to secure the middle track assembly to the lower fixed track assembly, whereby when the seat is pushed rearwardly the upper and middle track assemblies are returned to their initial position irrespective of whether the upper track (rail) assembly or middle track (rail) assembly starts to return to the initial (stacked) position first.

According to another aspect of the invention, the tilting of the seat back pulls a wire releasing the first latch mechanism permitting slidable relative movement of the upper track assembly with respect to the middle track assembly. When the upper track assembly is released for relative slidable movement, relative to the middle track, the latch memory means "memorizes" the initial position of the middle track assembly with respect to the lower track assembly. Thereafter, the continued forward movement of the upper track assembly causes the release of the middle track assembly for slidable movement with respect to the lower track assembly to which it was previously releasably secured as for example, by causing the release of a tooth of a latch mechanism carried on the middle track from a slot in the lower track and held out engagement therewith. In this regard, the tooth of this latch mechanism may be held out of engagement with the lower track assembly by the rotation of a lever to block the entry of the tooth of the latch mechanism into a notch or slot of the lower track assembly as the memory latch means memorized the initial position of the seat assembly as for example, by a tooth carried by the memory latch means engaging a notch or slot in the lower track (rail) assembly.

According to another aspect of the invention, the "synchronization" lever co-acts with both the latch mechanisms of the upper track (rail) assembly and middle track (rail) assembly releasably securing the upper track (rail) assembly to the middle track (rail) assembly and the middle track (rail) assembly to the lower track (rail) assembly and also the lever rotated to block the entry of the tooth of the latch mechanism carried by the middle track (rail) assembly into the notch or slot of the lower track (rail) assembly.

According to another aspect of the invention the delay lever ensures that the "memory" latch mechanism is not prematurely released before the upper and middle track (rail) assemblies are returned to their initial "stacked position". In this regard, the "memory" latch mechanism is acted upon by the delay lever to hold the memory in its "memorizing" position in the lower track (rail) assembly until the upper and middle track (rail) assemblies are secured in their initial positions. At that time, the delay lever is taken out of engagement with the memory latch mechanism thus permitting the "memory" to be withdrawn from its memorizing position for example, by the removal of a tooth of the "memory" from the notch or slot in the lower track (rail) assembly.

This seat assembly may be secured on one side of the seat cushion with the other side of the seat cushion sitting on a rail system comprising upper, middle and lower track (rails) which permit the seat cushion to move therealong as the seat cushion is caused to move by the action of the components of the seat assembly on the one side. Latch mechanism may also be provided for greater stability to releasably secure the tracks together and to release when corresponding latch mechanisms are released. According to another aspect of the invention, a seat assembly is provided having a front and rear end comprising three track assemblies, a fixed lower track assembly, a middle or second track assembly releaseably secured to the lower track assembly, and when released, being slideable to the front end with respect to the lower track assembly, and an upper or third track assembly releaseably secured to the middle track assembly, and when released, being slideable to the front end with respect to the middle track assembly, a first latch mechanism secured to the upper assembly pivotably releaseably secured to the middle track assembly, means secured to the first latch mechanism secured to the upper track assembly to release the first latch mechanism from securement with the middle or second track assembly, a second latch mechanism secured to the middle track assembly pivotally releaseably secured to the fixed lower track assembly, the first latch mechanism being disposed closer the rear end of the seat assembly than the second latch mechanism when the latch mechanisms are releaseably secured to the middle and lower track assemblies respectively, the first latch mechanism carrying means for engaging the second latch mechanism to release it from securement to the lower track assembly when the upper track assembly is released and moves away from the rear end of the seat assembly, means on the second latch mechanism to be engaged by the means carried on the first latch mechanism to cause the second latch mechanism to pivot to release the middle track assembly with respect to the lower track assembly, latch memory means secured to be longitudinally moveable relative to the fixed lower track assembly with the second latch mechanism when the second latch mechanism is released without release of the first latch mechanism, but fixed in position relative to the fixed lower assembly for lateral pivotal movement relative to the fixed lower track assembly to engage the lower track assembly to memorize the initial position of securement of the second latch mechanism in the fixed lower track when released by the forward movement of the first latch mechanism, and thus the upper track assembly, means carried by the middle track assembly released for movement by, the release and movement of the upper track assembly away from the rear end of the seat assembly after release of the first latch mechanism, and, by the release of the second latch mechanism from the lower track assembly by the forward movement to the front end of the first latch mechanism to thereby preclude the second latch mechanism from securing the middle track assembly to the fixed lower track assembly, the latch memory means being thereby released for memorizing the initial position of securement of the second latch mechanism after release of the first latch mechanism when the means for precluding the second latch mechanism from securing the middle track assembly to the fixed lower track assembly is positioned when the upper and middle track assemblies are released for movement, synchronization means and delay means for precluding the latch memory means from disengaging the fixed lower track assembly until the second latch mechanism is returned to its initial position securing the middle track assembly to the lower track assembly, the synchronization means for engaging the means for precluding the second latch mechanism from securing the middle track assembly to the lower fixed track assembly and prevent such means from permitting the second latch mechanism securing the middle track assembly to the lower fixed track assembly until the synchronization means is returned to its initial position, and the delay means for engaging the latch memory means and precluding the disengagement thereof with the fixed lower track assembly until the synchronization means is returned to its initial position at which time the delay means is caused to be returned to its initial position thereby permitting the means precluding release of the second latch mechanism from securing the middle track assembly to the lower fixed track assembly to be moveable to release the second latch mechanism to secure the middle track assembly to the lower fixed track assembly, whereby the seat assembly permits "sliding" displacement of components to provide ease of access and sufficient access to behind the seat assembly, providing a reliable "memory" for memorizing the seat assembly's initial position prior to the seat sliding forward, and returns to its initial position irrespective of whether the upper track assembly or middle track assembly starts to return to the initial position first.

BRIEF DESCRIPTION OF THE DRAWINGS

The invention will now be illustrated with reference to the following drawings of a preferred embodiment of the invention in which:

FIG. 5 is a front view of part of the structure shown in FIG. 4.

FIGS. 6 and 7 are side views of the tracks (rail) assemblies referred to in FIGS. 4 and 5, illustrating the relative movement thereof including means for precluding any further relative movement.

DETAILED DESCRIPTION OF THE EMBODIMENTS

Figure 1:
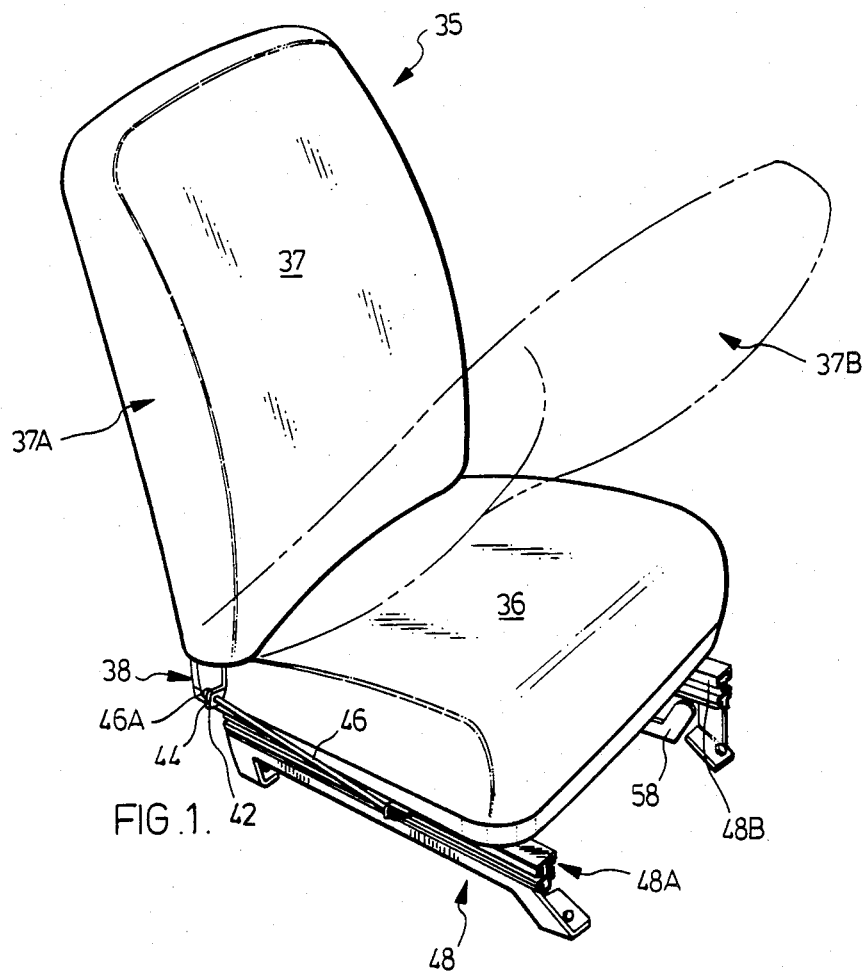
FIG. 1 is a perspective view of one front automobile seat constructed to incorporate a preferred embodiment of the invention (with parts not shown).

With reference to FIG. 1, there is shown front seat 35 of a two door down sized automobile (not shown) having seat bottom 36 and seat back 37 tiltable forwardly from its generally upright position 37A to that shown by the broken line 37B. Back 37 carries arm 38 from the bottom thereof carrying a small plate 42 having a bore 44 therethrough opening in the direction of the bottom 36. Wire 46 is fixed at one end 46a through bore 44 and extends towards the leading end (front) of seat bottom 36.

Figure 8:
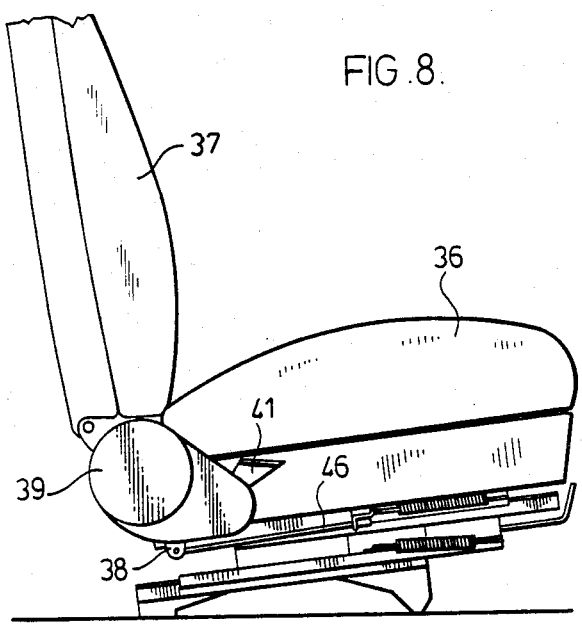
FIGS. 8, 9, 10 are side views of the seat shown in FIGS. 1, 2 and 3 being operated to move the back to a partially tilted position and a fully tilted position to permit access to behind the seat shown in FIG. 3.
Figure 9:
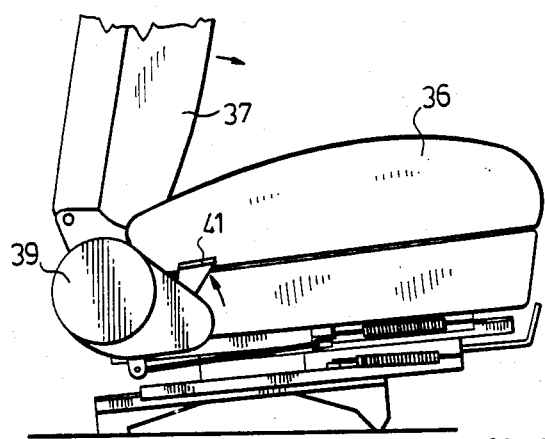
Figure 10:
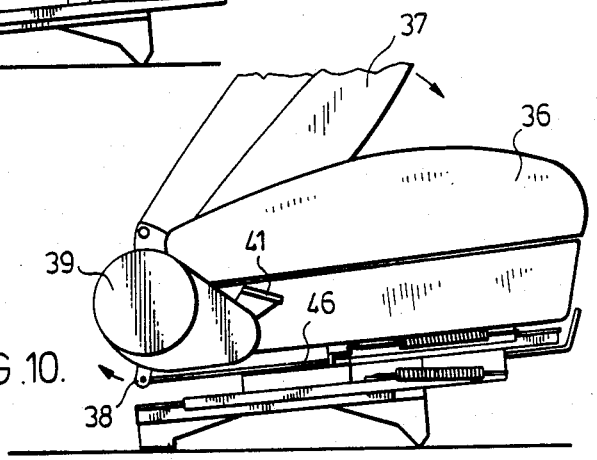

Arm 38 is in part covered by cover 39 (See FIGS. 8, 9, and 10) also covering normally stretched spring (not shown) when back 37 is locked by lever 41 in its upright position shown in FIG. 8. When lever 41 is fully depressed and back 37 tilted forwardly (see FIGS. 9 and 10) the spring is compressed assisting back 37 to pivot forwardly.

When lever 41 is partially depressed (see FIG. 9) seat back 37 is partially forwardly tiltable to permit some access to behind the seat (as for example, to place or retrieve packages).

Seat bottom 36 and thus seat 35 is supported on seat assembly 48 comprising assemblies 48A and 48B on either side of seat 35.

Figure 4:
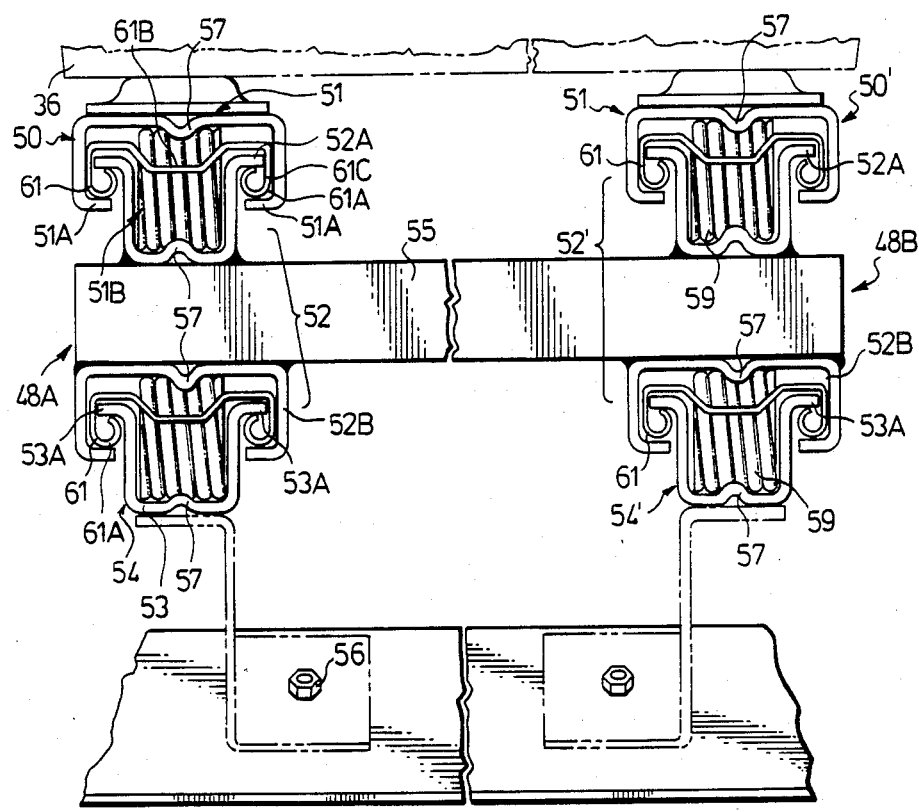
FIG. 4 shown with FIG. 3, is a front view illustrating the various track (rail) assemblies according to the preferred embodiment of the invention.

With reference to FIG. 4, assembly 48A comprises an upper track (rail) assembly 50, a middle track (rail) assembly 52 and lower track (rail) assembly 54,
 (a) the upper track (rail) assembly 50 fixed to the underside of seat bottom 36
 (b) the middle track (rail) assembly 52 releasably secured with respect to both the upper track (rail) assembly 50 and the lower track (rail) assembly 54 and when released with respect to either track, slidable with respect to such track (rail) assembly
 -and- (c) the lower track (rail) assembly 54 fixed by bolts 56 passing through the floor of the vehicle body (not shown). Assembly 48B also comprises 3 track (rail) assemblies—track (rail) assemblies 50$^1$ and 52$^1$, and 54$^1$, releasably secured to one another, for release of assembly 50$^1$ and 52$^1$ at the same time as assemblies 50 and 52 respectively-assembly 50$^1$ being released when assembly 50 is released, and assembly 52$^1$ being released at the same time as 52.

Figure 2:
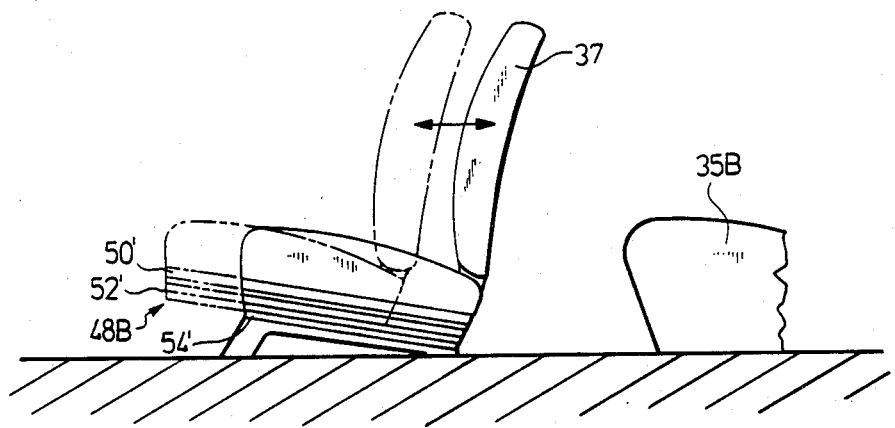
FIG. 2 is a schematic side view illustrating seat position adjustment of the seat shown in FIG. 1 relative to the back seat.

For adjusting the seat position closer to, or further from, the steering wheel (not shown) of the automobile (not shown) to the desired position of comfort of the driver or passenger, (see FIG. 2), assemblies 52 and 52$^1$ are released with respect to assemblies 54 and 54$^1$ but remain secured to assemblies 50 and 50$^1$. Lever 58 (See FIGS. 1 and 11) is secured to middle track 52 to assist in the release of middle track (rail) assembly 52 with respect to lower track 54 for slidable movement of assembly 52 on track 54. As is apparent from FIG. 11, when assembly 52 is released, middle track 52$^1$ of assembly 48B is also released with respect to lower track (rail) 54$^1$ to slide with middle track or rail assembly 52.

With respect to FIGS. 4, 5, 6 and 7, assemblies 50 and 50$^1$ comprise elongated downwardly opening U-shaped channel members 51 having inwardly directed lips 51A restricting the width of the channel mouth 51B secured to seat bottom 36. Track (rail) assemblies 54 and 54$^1$ comprises elongated upwardly opening U-shaped channel members 53 having outwardly directed lips 53A, the distance between the outer edges of lips 53A being less than the width of channel members 51 but greater than the channel mouth 51B. Assemblies 52 and 52$^1$ comprise upper elongated upwardly opening U-shaped channel members 52A constructed the same as channel members 53A for being slidably carried in channel 51 and lower elongated downwardly opening U-shaped channel members 52B constructed the same as channel members 51 for receiving, and being slidably carried on, channel member 53A. Each channel member 52A and 52B is spaced from, and connected to, one another by two cross-pieces 55 (See FIG. 11) for connecting assemblies 52 and 52$^1$ together and causing assemblies 52 and 52$^1$ to move together.

To limit the extension of track (rail) assemblies 50 and 52 relative to each other and track rail assembly 54, and assemblies 50$^1$ and 52$^1$ relative to each other and assembly 54$^1$ protrusions or bumps 57 are provided to extend into the channels and rollers 59 (each comprising a helical spring and supported in an aperture (not shown) of a carriage 61 comprising curled side arms for inserting between the outwardly and inwardly directed lips of coupled channel members) carried in the channels are jammed between bumps on the channel members as shown in FIGS. 6 and 7. Carriage 61 is in the form of a U-shaped channel member having centrally disposed portion 61B, side walls 61C carrying on each end curled side arm 61A.

As is apparent from FIGS. 6 and 7, that the extendibility of assembly 50 with respect to assembly 52 is limited by the position of the bumps on channel members 51 and 552A. Similarly, it is apparent that the extendibility of assembly 52 with respect to assembly 54 is limited by the position of these bumps.

Figure 3:
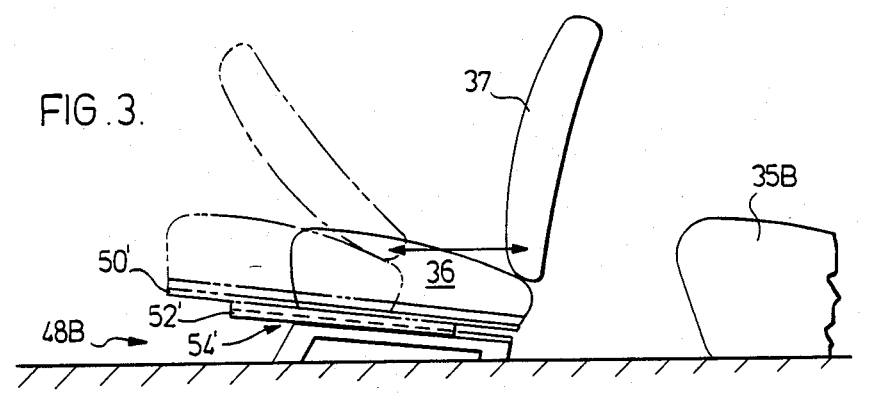
FIG. 3 is a schematic side view of the seat of FIG. 1 illustrating the operation of the seat assembly permitting ease of entry to the back seat according to the preferred embodiment of the invention.

For gaining access to the back, assemblies 50, and 52, and 50$^1$ and 52$^1$ of assemblies 48A and 48B of seat 35 are sequentially released for slidable movement of seat bottom 36 to the forward position shown by the broken line in FIG. 3. Sequential operation of the assemblies is activated by tilting back 37 forwardly pulling wire 46 rearwardly and manually pushing the back of seat 35 forwardly away from back seat 35B (See FIGS. 8, 9 and 10).

Figure 11:
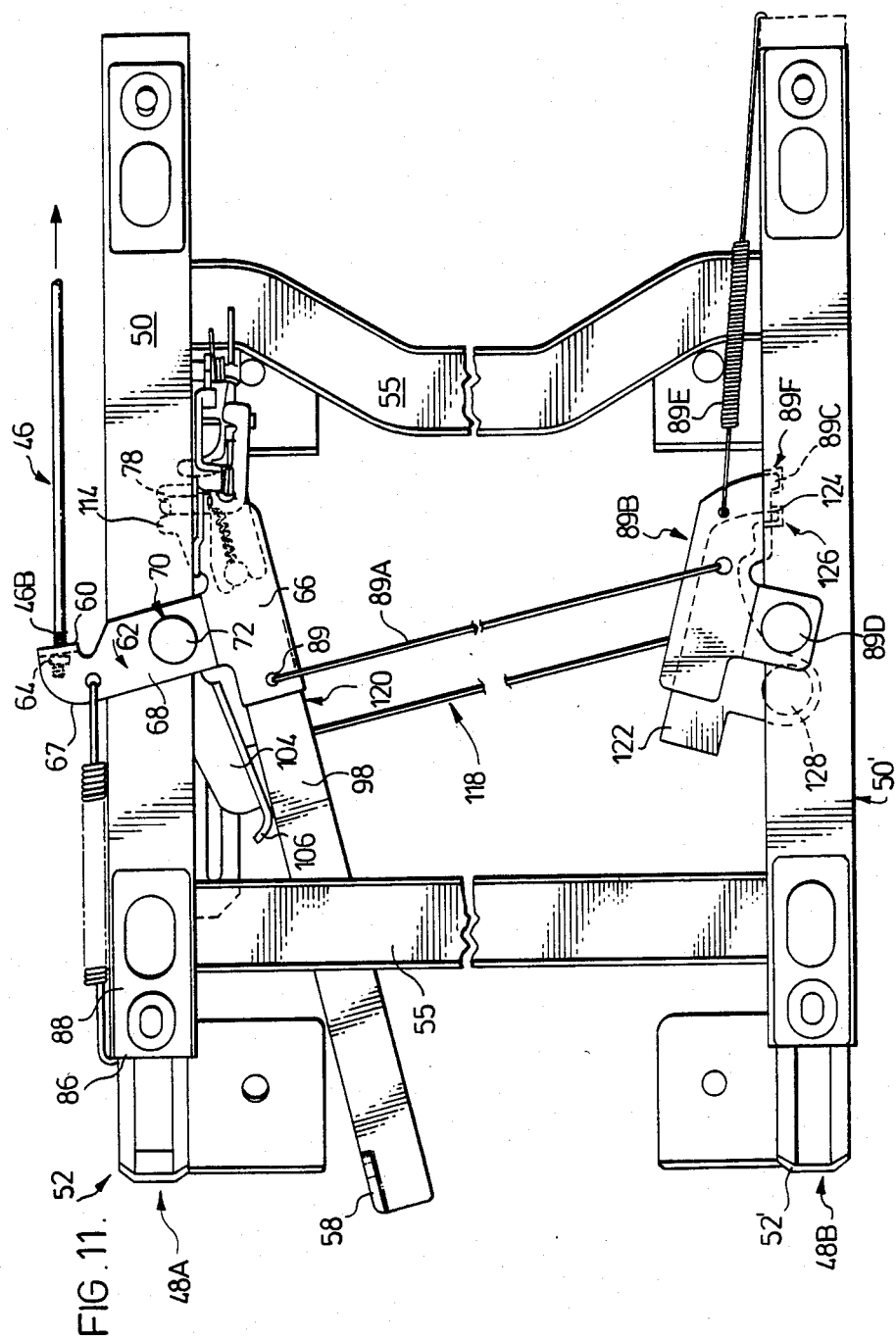
FIG. 11 is a top plan view of a seat assembly (to which the seat shown in FIG. 1 is secured) in its initial position which permits the seat to slide to a position shown in FIG. 3 is permit access to behind the seat according to the preferred embodiment of the invention.
Figure 14:
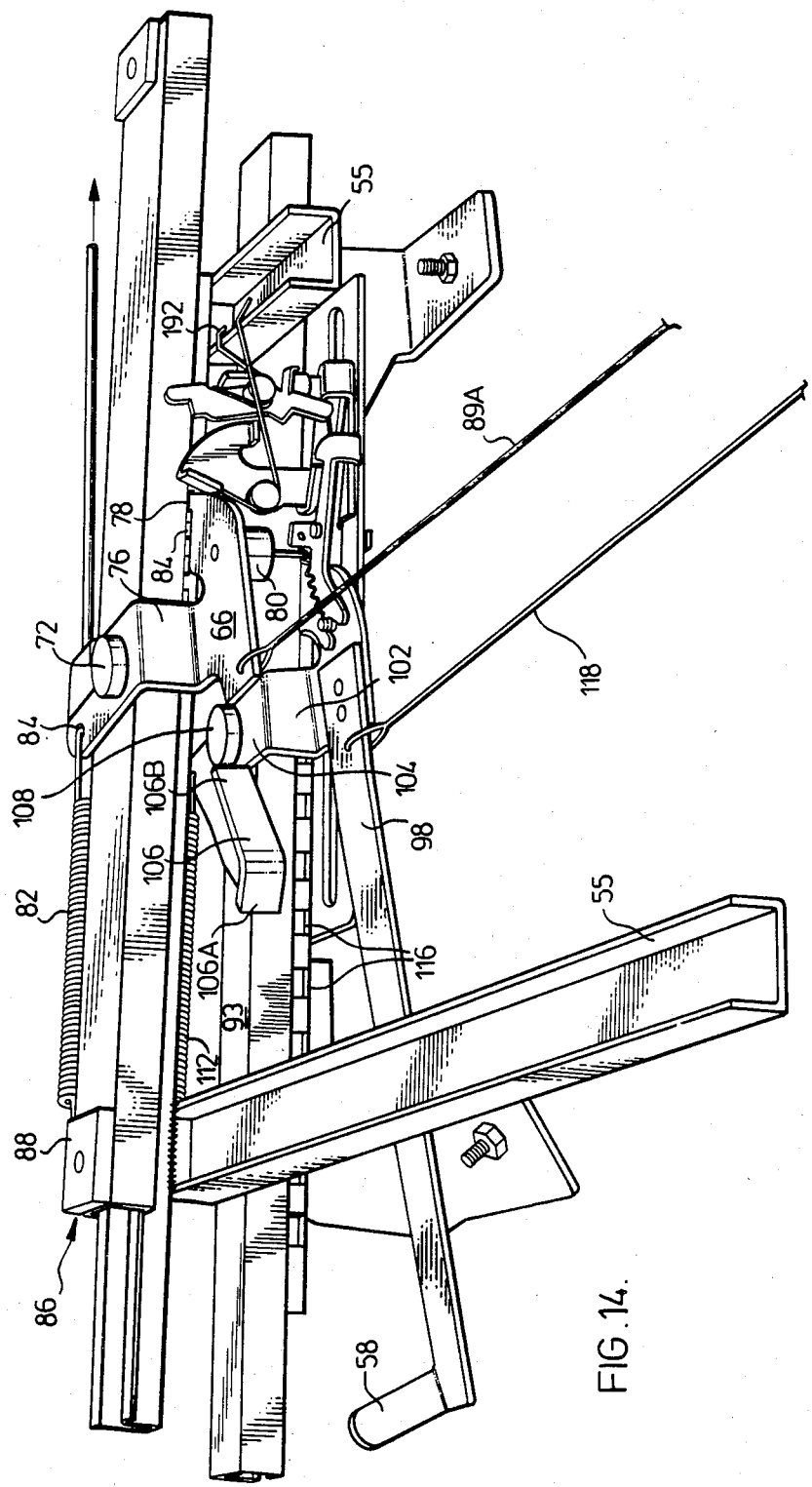
FIG. 14 is a perspective view of part of the assembly shown in FIG. 12 in its initial position.
Figure 15:
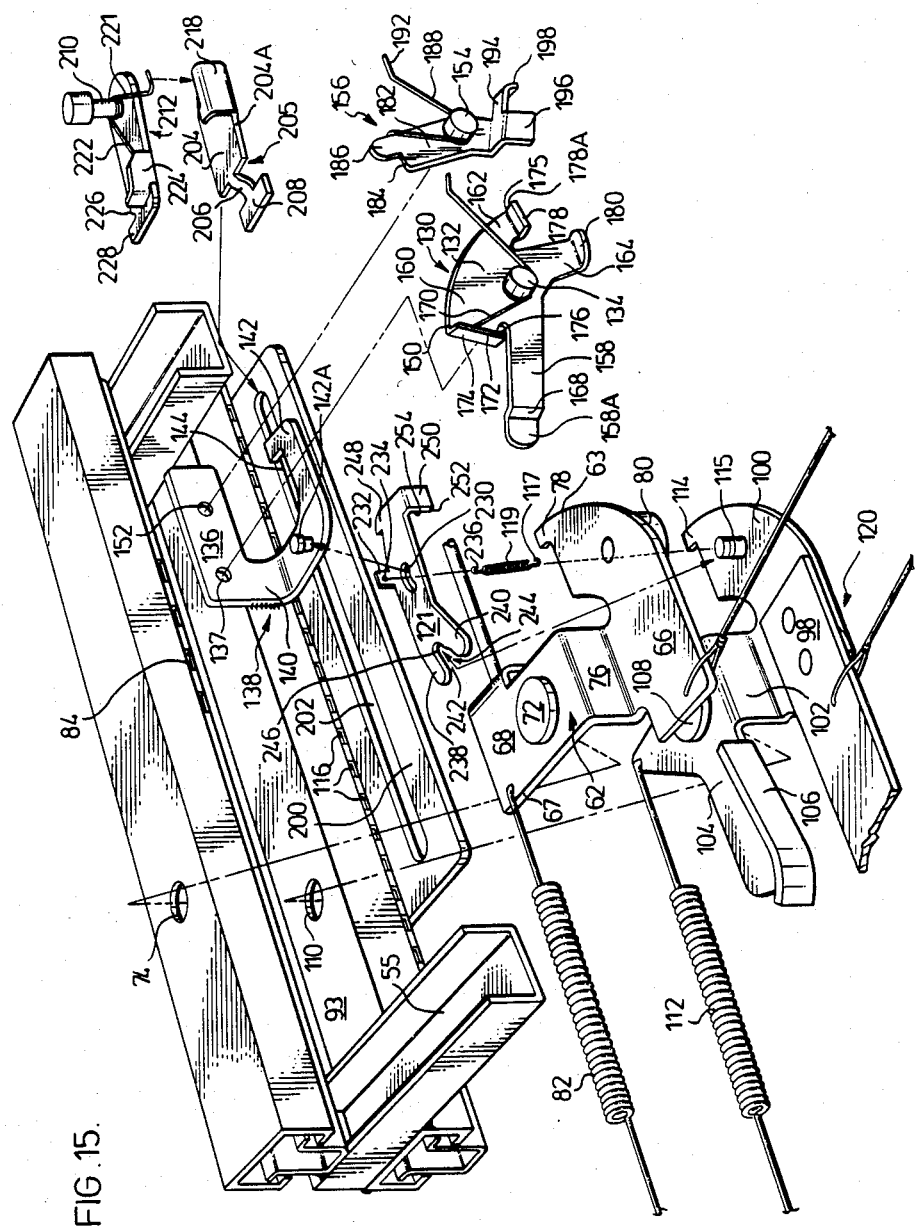
FIG. 15 is an exploded view of part of the assembly shown in FIG. 4.
Figure 16:
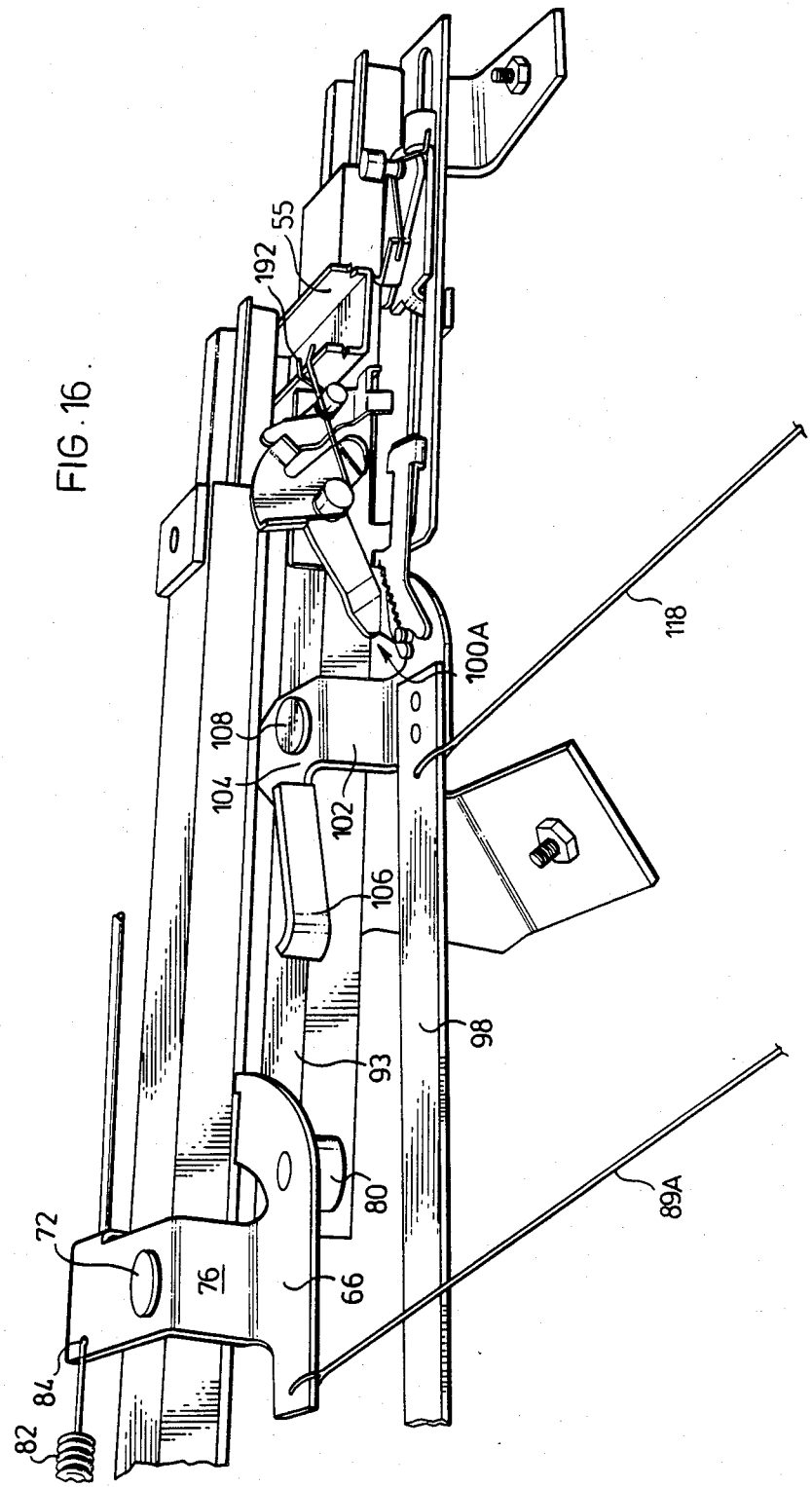
FIG. 16 is a perspective view of the assembly in another position during its operation according to the preferred embodiment of the invention.

With reference to FIGS. 11, 14 and 16, wire 46 is threaded at end 46B and passes through an aperture (not shown) in plate 60 extending from latch 62 and fastened thereto by nut 64 threaded onto end 46B. Latch 62 is generally T-shaped comprising latch member 66 and stem 68 is pivoted at 70 by a pin 72 fastened to upper track or (rail) assembly 50 of assembly 48A through aperture 74 (See FIG. 15) in upper track (rail) assembly 50. Latch member 66 is vertically spaced lower from stem 68 by elbow 76 (See FIG. 14) and carries on one end, tooth 78 (See FIG. 15). Roller 80 is secured to extend downwardly from the underside of latch member 66 proximate tooth 78. At the edge 67 of stem 68 remote plate 60 (See FIG. 11), spring 82 is secured at one end to stem 68 through aperture 84 at one end and at the other end to a leading end 86 of plate 88 used to secure track or rail assembly 50 to seat 30. Other plates 88 secured to rail assemblies 50 and 50$^1$ are used to secure assemblies 50 and 50$^1$ to seat 30. Arm 62 is urged to pivot clockwise on pin 72 when wire 46 pulls stem 68 towards the seat back 35B. Tooth 78 of latch 62 is received in notch 84 in middle track 52. On the end of cross-member 66 opposed tooth 78 is aperture 89 to which straight wire 89A is secured at one end. Wire 89A drawn tight is secured at its other end to latch 89B which carries tooth 89C pivotally secured to upper track 50$^1$ by pin 89D and biased by spring 89C to urge tooth 89c into notch 89F of middle of track 52$^1$ of assembly 48B until caused to pivot out of notch 89F by the pivoting of arm 62 by wire 89A pulled by the pivoting of latch 66.

Lever 58 (seen best in FIG. 14) comprises planar lever arm 98 carrying latch 100 on the end thereof (See FIG. 15). Intermediate the ends of arm 98, upstanding connector 102 connects arm 98 to upper portion 104 carrying upstanding flange 106 comprising upstanding flange formations 106A and 106B angled relative to one another disposed in a vertical plane to be engaged by roller 80 carried below portion 66 of latch 62. Portion 104 is pivotally secured to top 93 of member 52B by pin 108 through aperture 110 and biased by spring 112 to urge tooth 114 into one of notches 116 provided in the side wall of U-shaped lower track (rail) assembly 54. Latch 100 also carries upstanding cylindrical projection 115 for securing one end 117 of spring 119 to delay lever 121 (See FIG. 15) for assisting to maintain the appropriate position of delay lever 121 as hereinafter discussed.

Wire 118 is secured at one end to arm 98 near side edge 120 of lever 58 on the side of pivot pin 108 relative the length of lever 58 remote tooth 114 and at the other end to latch 122 so that when arm 58 is pivoted on pin 108, latch 122 also pivots. Latch 122 is constructed similarly to latch 89B and operates in the same manner as latch 89B to remove and insert tooth 124 in a notch 126 in bottom rail 54$^1$. Latch 122 is pivotally secured to the middle rail 52$^1$ of assembly 48B by pivot pin 128. When the end of lever 58 protruding from the front of seat 32 is pushed laterally towards assembly 48A, latch 100 pivots on pin 108 freeing tooth 114 from notch 116 while latch 122 pivots on pin 128 to release tooth 124 from notch 126 of the lower track 54$^1$.

Assembly 48A includes release lever 130 comprising a central vertically extending planar portion 132 (See FIG. 15) through which pivot pin 134 is secured through aperture 137 of upper flat plate portion 136 of U-shaped holder 138 secured to middle track (rail) assembly 52. U-shaped holder 138 comprises connector 140 angled 90° to plate portion 136 and generally U-shaped portion 142 connected to connector 140 angled 90° to each of plate 136 and connector 140 to define recess 144. Holder 138 also includes cylindrical upstanding projection 142A.

Spring 150 is wrapped about pivot pin 134 with one end abutting surface 176 of flange 172 of release lever 130 and the other end overlying the rearmost crosspiece 55 (See FIG. 14). Aperture 152 is provided through plate portion 136 for receiving pivot pin 154 of synchronization lever 156.

Central portion 132 of release lever 130 also carries generally radially extending arms 158, 160, 162 and 164. Arm 158 is finger-like bent intermediate its ends at 168 to provide tip 158A. Arm 160 comprises flat portion 170 extending from central portion 132 to flange 172 bent 90° to portion 170 to provide abutment surfaces 174 and 176, surface 174 against which the outer surface 63 of latch 62 proximate tooth 78 may abut and surface 176 against which one end of spring 150 abuts after being wrapped around pivot pin 134 as previously described. Arm 162 forms a continuation of the plane of central portion 132 of lever 130 and carries on the end at 175, outstanding flange 178 angled at 90° to the plane of arm 162. Arm 164 is constructed in the same manner as arm 162 and carries outstanding flange 180 angled at 90° to the plane of arm 164.

Synchronization lever 156 comprises upwardly directed finger portion 182 carrying step 184 against which flange 178 is to abut and bulbous end 186 adjacent step 184. Compression spring 188 has one end 190 wrapped around bulbous end 186 on the side thereof remote step 184, the other end 192 seating over the rearmost cross-piece 55 and is wrapped around pivot pin 154 in its center. Pivot pin 154 is in turn secured in aperture 152 of holder 138. The lower portion of synchronization lever 156 radially opposite pin 154, carries outwardly directed flange 194 at 90° to the plane of synchronization lever 156 and carries downwardly extending flange 196 on the side edge remote the plane of lever 156 but parallel to the plane of lever 156 and hook 198 extending from its end remote flange 196.

The underside of track assembly 54 carries plate or slide rail 200 extending from one side extending toward assembly 48B and carries elongated slot 202. Mounting plate 204 has an aperture (not shown) therethrough for receiving pivot pin 210 secured to memory latch 212. Plate 204 carries on the leading end 205 sloped connector 206 connected to smaller rectangular plate 208, the vertical distance between plates 204 and 208 being about the thickness of rail 200.

Side 204A of plate 204 carries upstanding curved flange 218 for receiving end 220 of spring 221 which is wrapped around pivot pin 210 of memory latch 212 and which spring 221 abuts at other end 222, curved upstanding flange 224 of memory latch 212. Memory latch 212 also carries tooth 228 on side 226 thereof.

Delay lever 121 comprises an elongated piece of metal carrying, centrally disposed elongated curved opening 230, upstanding flange 232 (on the side of lever 121 closer track 52 of assembly 48A) carrying hole 234 for securing end 236 of spring 119, fingers 238 and 240 on the end of lever 121 closer latch 100, spaced by a tapering slot 242 from mouth 244 to the reduced slot portion 246 closer slot 230, tooth 248 extending laterally from the same side of lever 121 as upstanding flange 232 and vertically downwardly extending flange 250 (from the side of lever 121 further from track 53 of assembly 48A) carrying inwardly directed flange 252 to grasp and wrap around the side edge of U-shaped portion 142 of holder 138.

Figure 12:
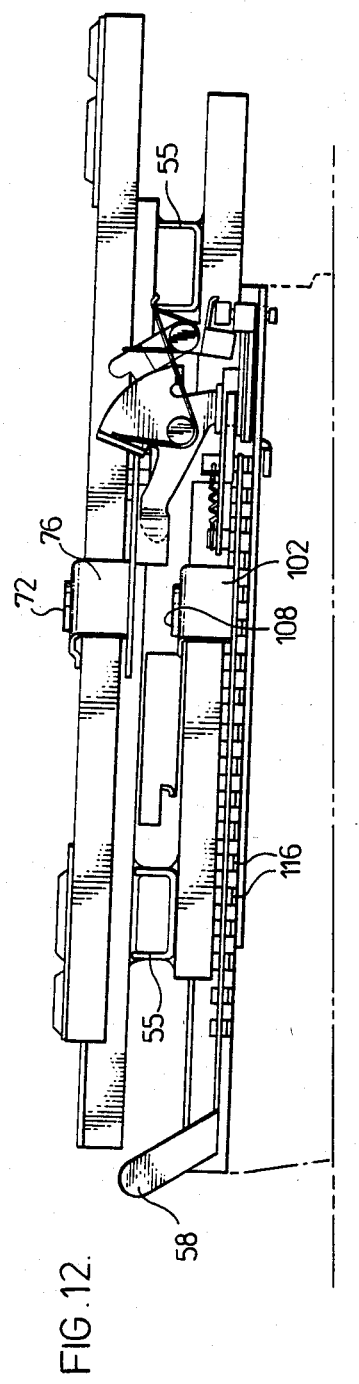
FIG. 12 is a side view of part of the assembly shown in FIG. 11 in its initial position.

Normally seat bottom 36 and thus assemblies 48A and 48B are in the position shown in FIGS. 11, 12 and 14. Latches 62 and 89B of assemblies 48A and 48B respectively, secured to upper rails 50 and 50[1] respectively are pivotally releasably secured to assemblies 52 and 52[1] respectively by teeth 78 and 89C respectively in notches 84 and 89F respectively. Latches 100 and 122 of assemblies 48A and 48B respectively are secured to assemblies 52 and 52[1] respectively and releasably pivotally secured by teeth 114 and 124 to lower assemblies 54 and 54[1] in notches 116 and 126 respectively. Release lever 130 urged to rotate counterclockwise by spring 150 (see FIG. 15) is held from so rotating by edge 63 (See FIG. 15) engaging abutment surface 174 of flange 172.

Figure 13:
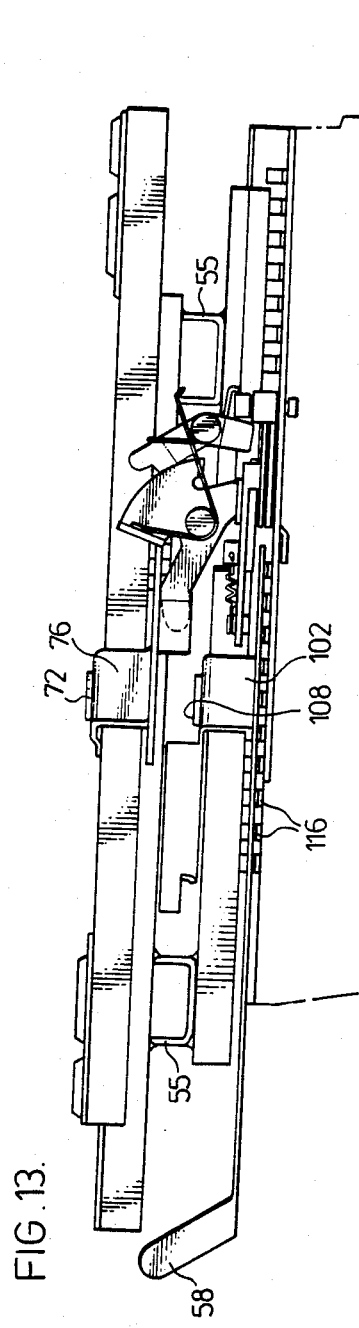
FIG. 13 is a side view of the assembly shown in FIG. 12 after adjustment of the assembly to the comfort of the user.
Figure 21:
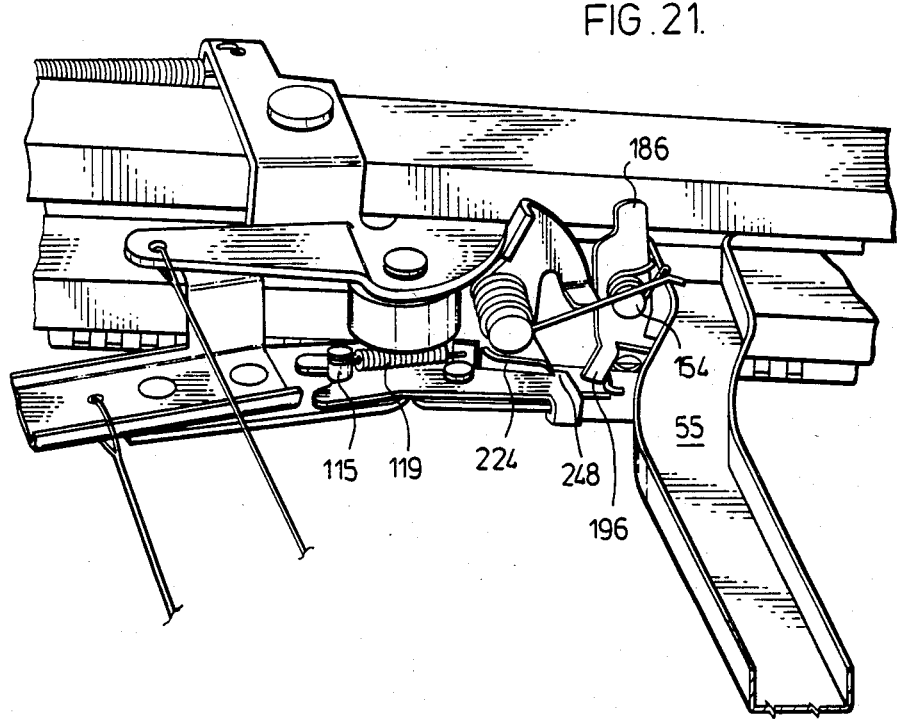
FIG. 21 is a perspective view illustrating part of the assembly.
Figure 22:
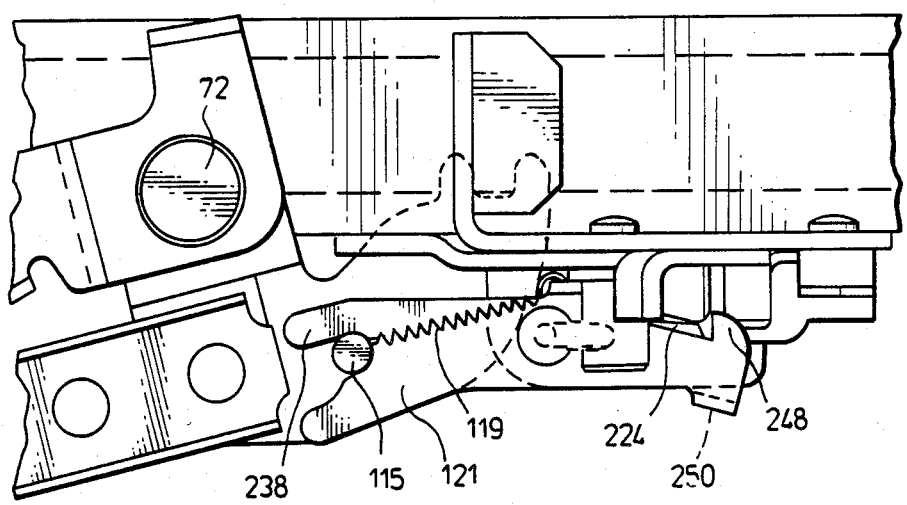
FIG. 22 is a top plan view illustrating some of the components of the assembly.
Figure 23:
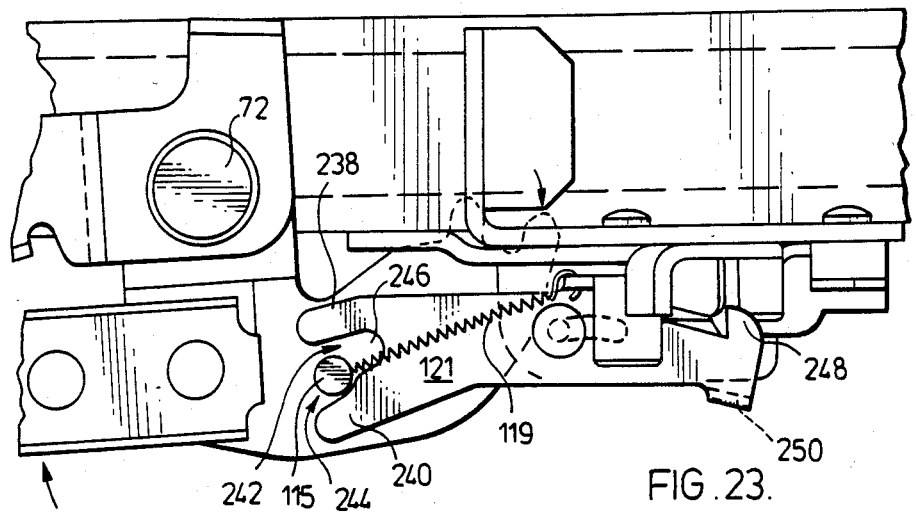
FIG. 23 is a top plan view illustrating the components shown in FIG. 22 in different positions during use.

In this position, release lever 130 holds memory latch 212 against the action of spring 221 (which spring 221 urges memory latch 212 to rotate towards assembly 54) within recess 144 of U-shaped holder 138 by the positioning of flange 180 between to flange 224 and channel 53 of assembly 54. Synchronization lever 156 urged to rotate counterclockwise by the action of spring 188, is held from rotating counterclockwise by its engagement with release lever 130. Delay lever 121 is positioned so that tooth 248 is held from moving towards latch 100 by upstanding flange 224 of memory latch 212. (See also FIGS. 21 and 22). With reference to FIGS. 13 and 23, when the position of seat 32 relative to the front steering wheel (not shown) of the car (not shown) is to be adjusted either forward towards the steering wheel or front window or away from it for the comfort of the driver or passenger occupying the seat, lever 58 is activated by grasping the front part below bottom 36 and pushing it laterally towards assembly 48A against the action of spring 112, pulling wire 118 and releasing tooth 114 from a notch 116 in lower rail assembly 54. When wire 118 is pulled latch 122 is pivoted against the action of spring 89E dislodging tooth 89C from notch 89F of the lower rail assembly 54[1] of sub-assembly 48B. Therefore, assemblies 52 and 52[1] are released relative to assemblies 54 and 54[1] respectively for free sliding movement of the assemblies 52 and 52[1] (carrying assemblies 50 and 50[1] and seat bottom 36 relative to assemblies 54 and 54[1].

Figure 17:
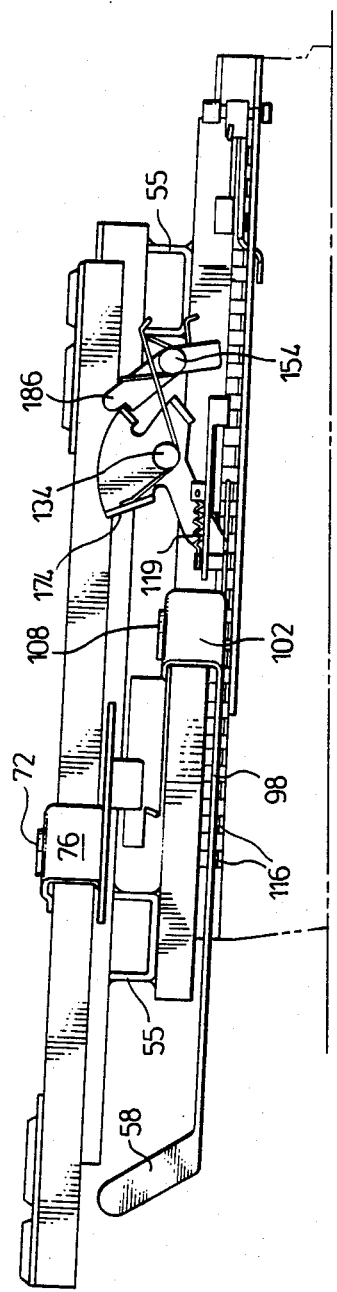
FIGS. 17, 18 and 19 are side and plan views illustrating portions of the assembly and components thereof, in still yet other positions according to the embodiment of the invention.
Figure 18:
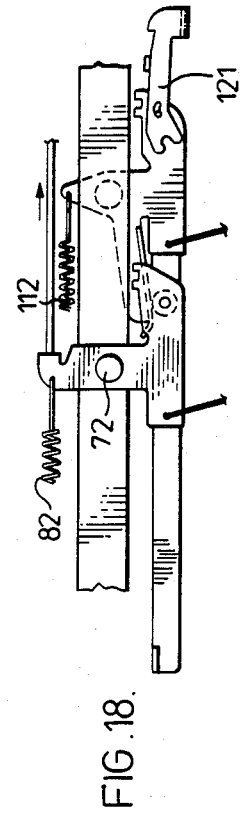
Figure 19:
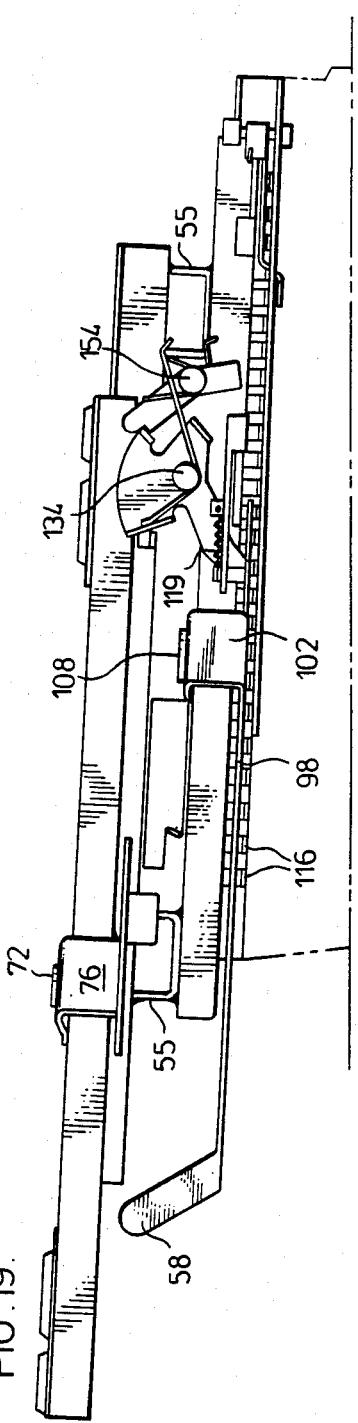
Figure 20:
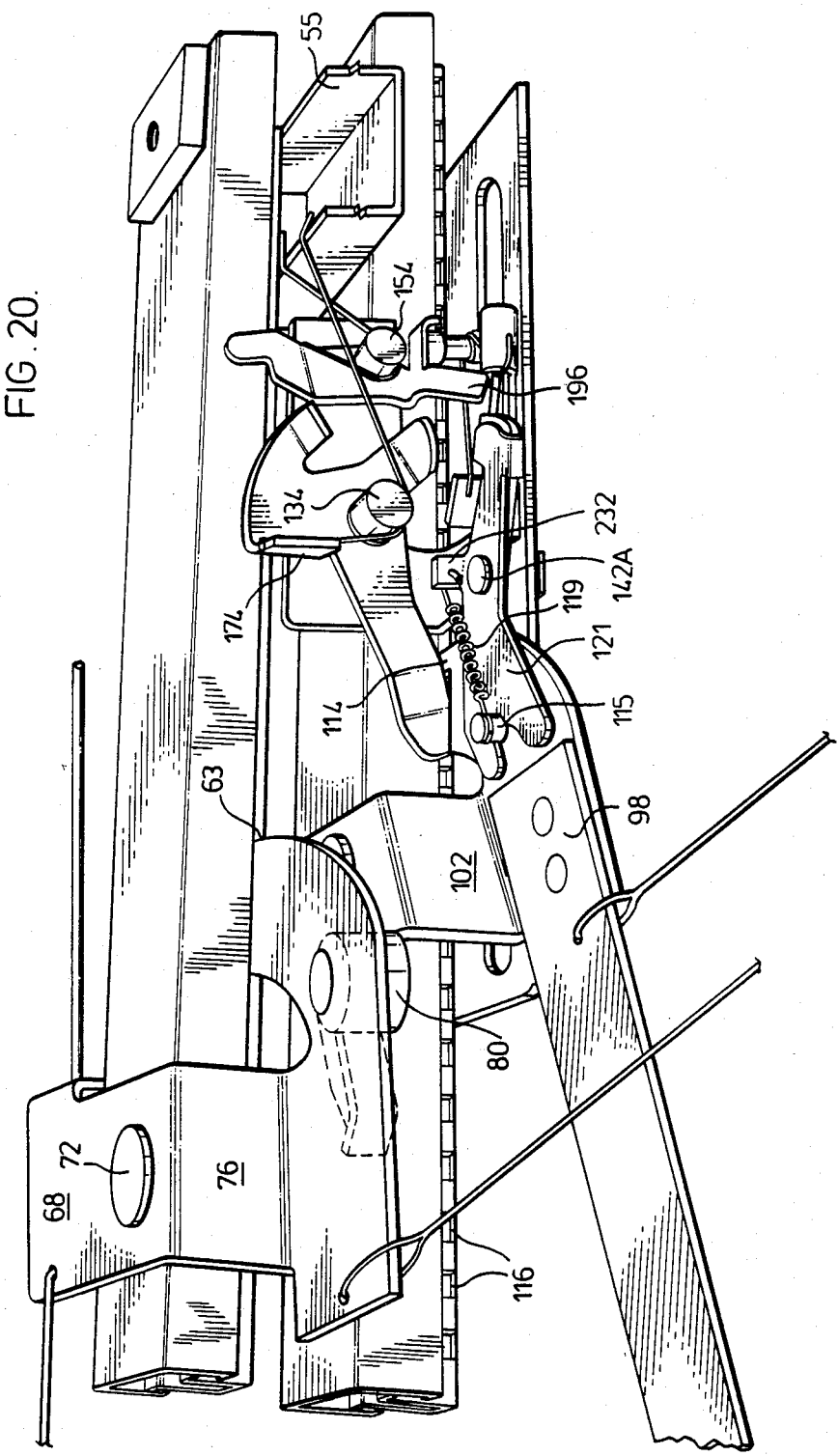
FIG. 20 is a perspective view of part of the assembly shown returning to its initial position.

When access to the back seat is wanted, back 37 is pulled forwardly pulling wire 46 rearwardly. As wire 46 is pulled rearwardly, latch 62 pivots about pivot pin 72 removing tooth 78 from a notch 84 in assembly 52 releasing upper track (rail) assembly 50 for slidable movement relative to middle track (rail) assembly 52. At the same time, the pivoting of latch 62 pulls wire 89A causing latch 89B to pivot about pin 89D removing tooth 89C from notch 89F assembly 52[1]. Seat 35 is then pushed forwardly. As seat bottom 36 is moved forwardly edge 63 is moved forwardly away from the face 174 of flange 172 of release lever 130 permitting lever 130 to pivot about pin 134 so that tip 158A of finger 158 sits on edge portion 100A of latch 100 proximate tooth 114—(See FIG. 16). As lever 130 rotates, flange 180 of lever 130 rotates counterclockwise away from flange 224 in recess 144, permitting memory latch 212 to pivot around pin 210 towards a notch 116 in assembly 54. At this point, tooth 248 of delay lever 121 is not interfered with, or confined by, upstanding flange 224 so that delay lever 121 is free to move with respect to holder 138. As assembly 50 moves forwardly, roller 80 engages flange 106B of upstanding wall formation 106. Because flange 106 is angled to extend away from assembly 52, roller 80 moving forwardly, pivots V-shaped portion 104 about pin 108 pivoting latch 100 away from assembly 54 removing tooth 114 out of a notch 116 in assembly 54. (See FIGS. 17 to 19 inclusive). As tooth 114 is moved from notch 116, portion 158A of arm 158 of lever 130 comes between tooth 114 and track (rail) assembly 54 to prevent insertion of tooth 114 into any notch 116 until lever 130 is rotated clockwise. Thereafter, as roller 80 moves forwardly of flange 106, latch 100 is urged towards its initial position by spring 112. However, tooth 114 is precluded from entering any notch 116. When latch 100 is pivoted by roller 80 riding on wall formation 106B of flange 106, wire 118 is pulled pivoting latch 122 about pin 128 pivoting tooth 124 from notch 126 in assembly 54$^1$ until tooth 114 is able to enter the notch 116 from which it was previously removed. Assemblies 52 and 52$^1$ are now slidable with respect to assemblies 54 and 54$^1$ respectively.

Figure 24:
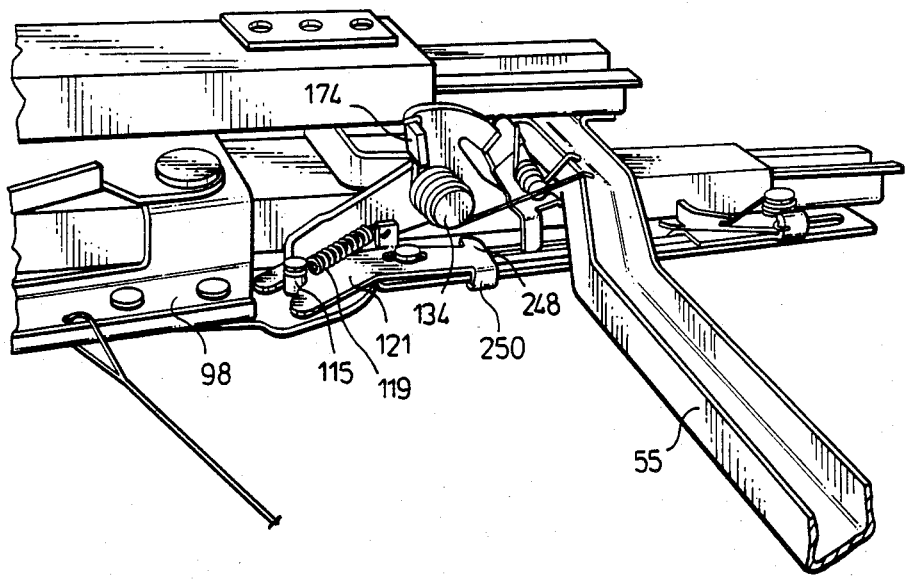
FIG. 24 illustrates the position of some of the components in FIG. 21 when the seat is moved forwardly to fully extend the track (rail) assembly relative to its initial position.

As assemblies 50 and 50$^1$ are moved forwardly, the extendibility of the track (rail) assemblies is limited by depressions 57 and rollers 59. Therefore, at maximum extendibility further movement of assemblies 50 and 50$^1$ pulls assemblies 52 and 52$^1$ respectively forwardly. As assembly 52 moves forwardly, release lever 130, delay lever 121 and synchronization lever 156 move forwardly. As synchronization lever 156 moves forwardly, flanges 194 and 198 rotate counterclockwise urged by spring 188 over the top of pin 210 so that synchronization lever 156 does not interfere with the forward motion of assembly 52. As synchronization lever 156 rotates, step 184 is positioned below flange 178 with bulbous end 186 engaging the top edge 178A of flange 178. As seat 35 is moved to its forward position, assemblies 50 and 50$^1$ become fully extended relative to assemblies 52 and 52$^1$ and assemblies 52 and 52$^1$ are fully extended with respect to assemblies 54 and 54$^1$. See FIGS. 16 and 24. (See also FIGS. 4, 5 6 and 7 for operation). Therefore, access to behind seat 35 to the back seat has been provided.

Seat 35 may then be returned to its initial position in two ways-assemblies 50 and 50$^1$ may start back first or assemblies 52 and 52$^1$ carrying assemblies 50 and 50$^1$ respectively may start back first.

Figure 25:
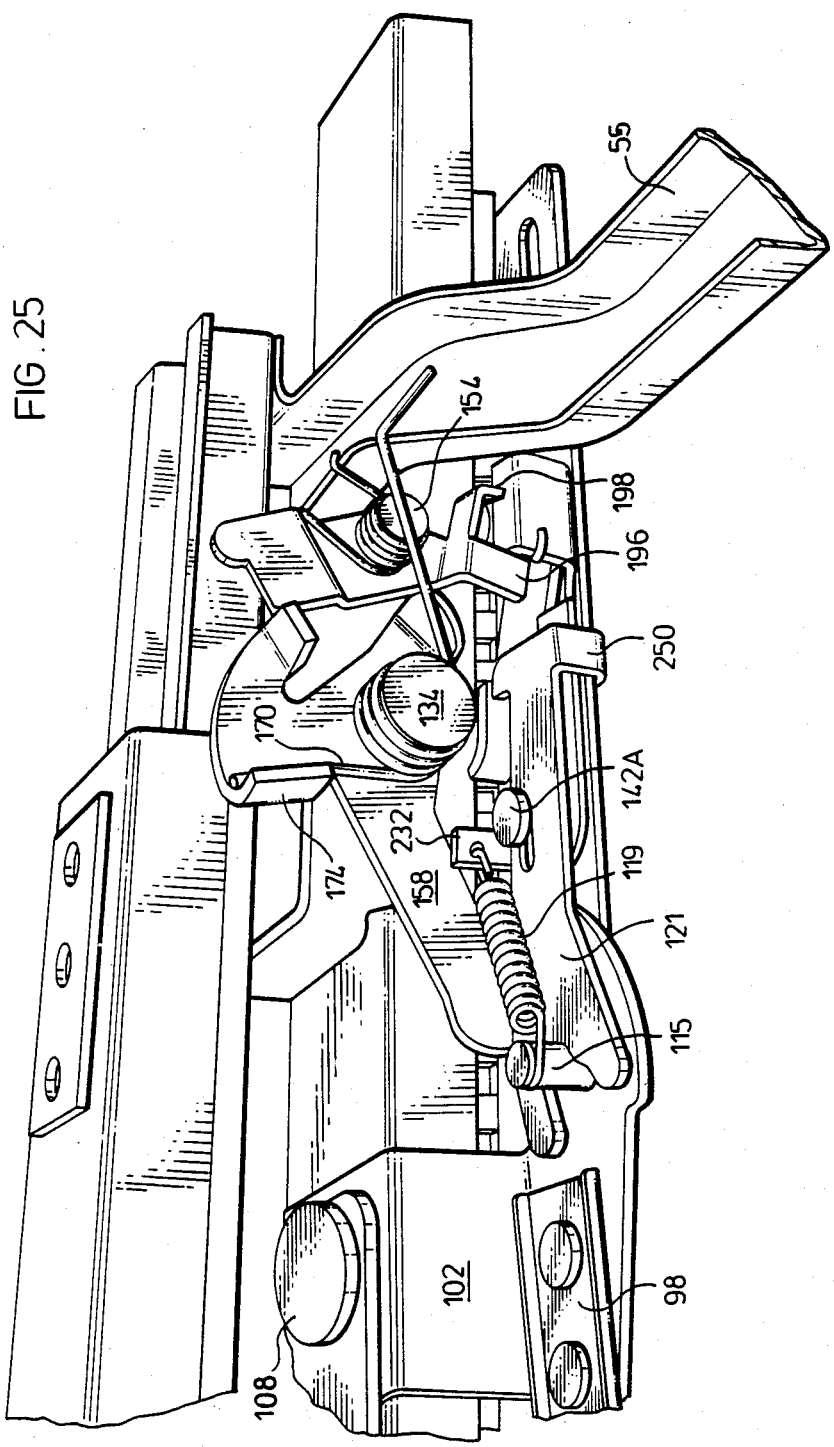
FIG. 25 is a close-up perspective view of part of the assembly shown in FIG. 24.
Figure 26:
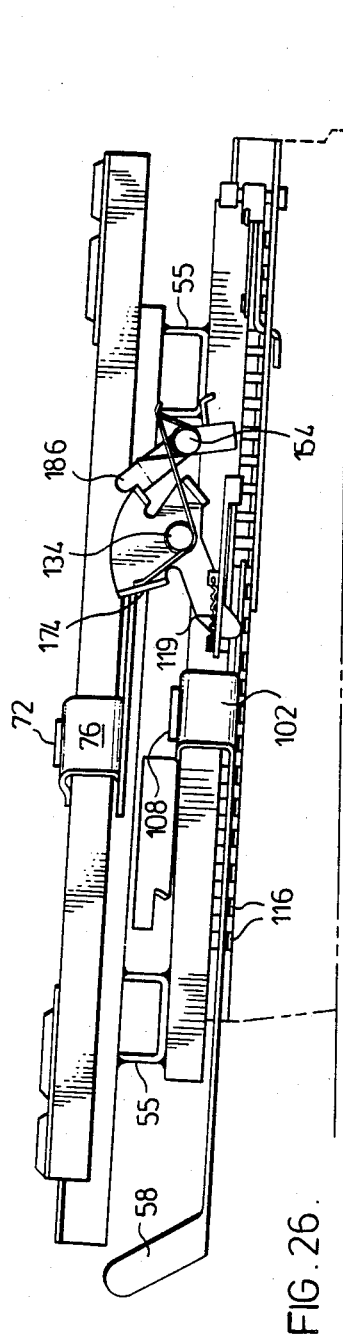
FIGS. 26 to 31 inclusive are side views of parts of the assembly in still yet other positions during use of the seat assembly according to the preferred embodiment of the invention.
Figure 27:
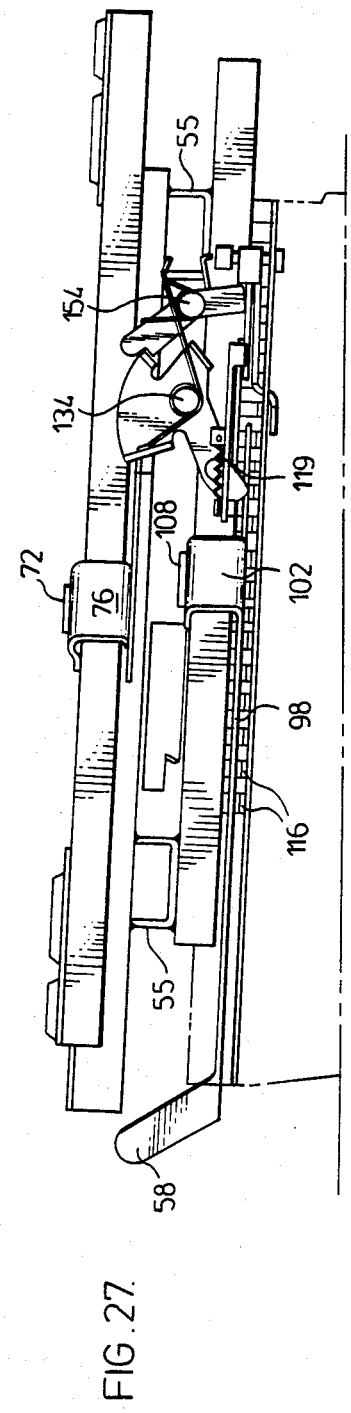

Normally, upper track (rail) assemblies 50 and 50$^1$ start back first. In this regard, as back 37 is pushed back to the vertical and seat 35 pushed back, wire 46 is relaxed, and upper track assemblies 50 and 50$^1$ are returned along assemblies 52 and 52$^1$ respectively carrying latches 62 and 89B until roller 80 of latch 62 engages angled portion 106A of flange 106, rides along flange 106 over apex 106C and along portion 106B to the position shown in FIGS. 26 and 27. Thereafter, latch 62 (and thus latch 89B) is moved rearwardly until edge 63 proximate tooth 78 of latch 62 engages face 174 of flange 172 trying to rotate lever 130 clockwise. Lever 130 is however unable to be rotated because of flange 178 sitting on step 184 of synchronization lever 182 with side edge 178 engaging bulbous end 186. As lever 62 is pushed rearwardly by the movement of track (rail) assembly 50, track (rail) assembly 52 (with rail assembly 52$^1$) passes through the position shown in FIG. 26 until the assembly reaches the position shown in FIG. 27. Delay lever 121 is also moved rearwardly as track (rail) assembly 52 is moved rearwardly. As it does so, tooth 248 of delay lever 121 engages upstanding flange 224 of memory latch 212, holding tooth 228 in a notch 116 (See FIG. 25). As a result, tooth 228 of the memory latch 212 cannot be removed or dislodged by the application of excess force because of the positioning of tooth 248 to the side of flange 224 pushing it inwardly. Therefore, tooth 228 cannot be prematurely released before tooth 114 on lever 100 is returned to the notch 116 from which it was removed.

Figure 28:
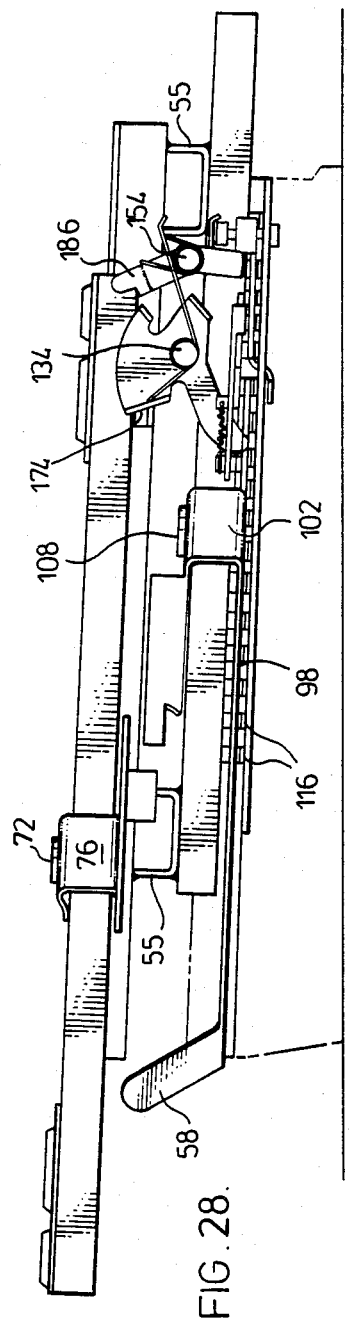
Figure 29:
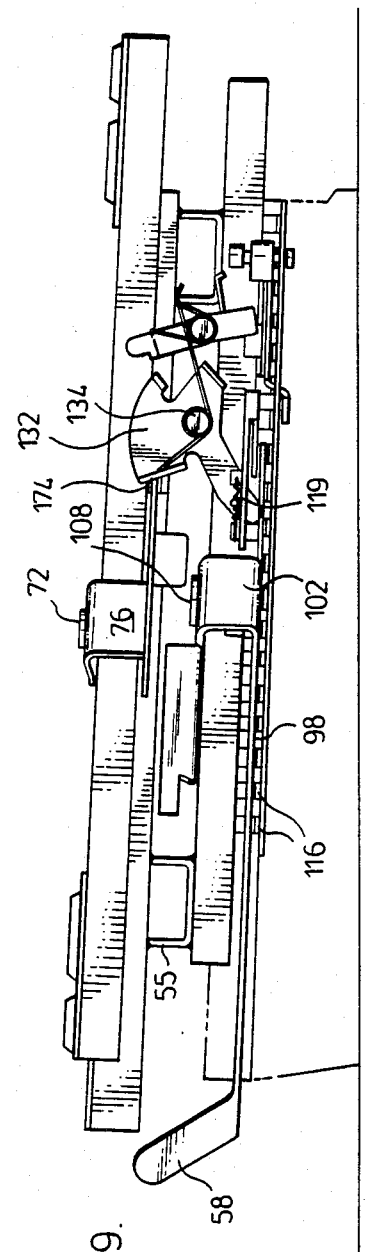
Figure 30:
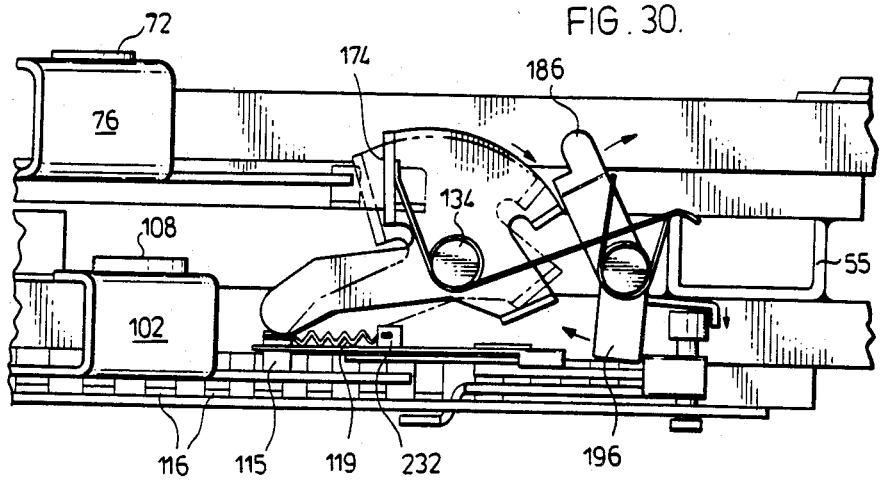
Figure 31:
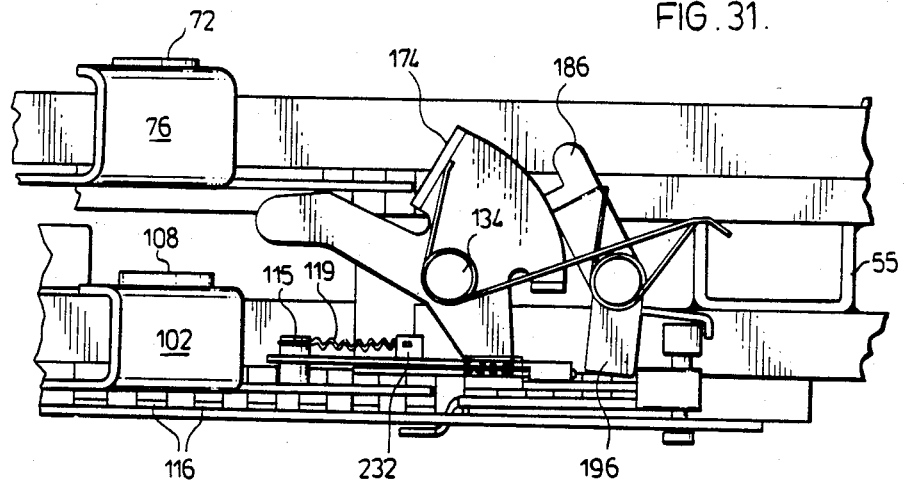

As the assembly is pushed rearwardly, flange 194 and hook 198 pass over pin 210 with flange 196 engaging the leading curved edge of upstanding flange 218 causing synchronization lever 182 to rotate clockwise moving step 184 away from flange 178, permitting the rotation of flange 178 clockwise and thus lever 130 clockwise until step 184 passes from behind flange 178 permitting synchronization lever to seat over pin 210 as shown in FIG. 30. As step 184 rotates, lever 130 rotates moving tip 158A of arm 158 away from tooth 114 of latch 100 thereby permitting tooth 114 to enter a notch 116 in lower track (rail) assembly 54. At the same time, latch 122 will be in a position to reposition tooth 124 in notch 126 of assembly 54$^1$. As latch 100 is released for the return of tooth 114 into a notch 116, pin 115 is forced into converging slot 242 pushing delay lever 121 rearwardly (by pivoting and sliding) until tooth 248 is disengaged from contact with upstanding flange 224 of latch 212. Thereafter, as lever 130 rotates, arm 164 and thus flange 180 rotates into engagement with flange 224 pushing flange 224 away from track (rail) assembly 54 removing tooth 228 from a notch 116 against the action of spring 221. Thereafter, edge 63 of latch 62 pushes face 174 of flange 172 to its final position (See FIG. 31).

Where the middle track (rail) assembly 52 starts to return first with track (rail) assembly 50 following (See FIGS. 28 and 29) flange 196 of synchronization lever 156 engages flange 218 of plate 204 causing synchronization lever 156 to rotate with flanges 194 and 198 passing over pin 210 to the position shown in FIG. 28. In that position tooth 248 engages flange 224 of memory latch 212 precluding removal of tooth 212 from a notch 116.

Thereafter, the pushing of back 37 and seat 35 to their initial positions, assemblies 50 and 50$^1$ are returned along assemblies 52 and 52$^1$ taking latches 62 and 89B with them until edge 63 of latch 62 engages face 174 of flange 172 rotating lever 130 and thus lifting finger 158. This action permits the resetting of tooth 114 into notch 116 (from which it was originally removed. Pin 115 is thus forced to push back delay lever 121. Continued rotation of lever 130 causes arm 164 and flange 180 to engage formation 224 of memory latch 212 removing tooth 228 of memory latch 212 from notch 116.

Therefore, irrespective of whether the upper or middle track or rail assemblies start to return first when seat back 37 and seat bottom 36 are pushed back towards their initial position, the system and assemblies will return to their initial positions easily and entirely reliably.

As many changes can be made to the preferred embodiment without departing from the scope of the invention, it is intended that all matter contained herein be interpreted as illustrative of the invention and not in a limiting sense.

The embodiments of the invention in which an exclusive property or privilege is claimed are as follows:

1. A seat assembly having a front and rear end comprising three track assemblies, a fixed lower track assembly, a middle or second track assembly releaseably secured to the fixed lower track assembly and when released being slideable with respect to the lower track assembly and an upper track assembly releaseably secured to the middle track assembly and thus the lower track assembly and when released being slideable with respect to the middle track assembly and thus the lower track assembly—including a first latch mechanism secured to the upper track assembly pivotally secured to the middle or second track assembly for releaseably securing the upper track assembly to the middle track assembly a second latch mechanism secured to the middle track assembly pivotally secured to the lower track assembly for releaseably securing the middle track assembly to the lower track assembly, the first latch mechanism being disposed closer the rear end of the seat assembly than the second latch mechanism when the latch mechanisms are releaseably secured to the middle and lower track assemblies respectively, the first latch mechanism carrying means for engaging the second latch mechanism to release it from securement to the lower track assembly when the upper track assembly is released and moves away from the rear end of the seat assembly, means on the second latch mechanism to be engaged by the means carried on the first latch mechanism to cause the second latch mechanism to pivot to release the middle track assembly with respect to the lower track assembly, carrying means for engaging the second latch mechanism and latch memory means for memorizing the initial position of the middle assembly relative to the lower track assembly, latch memory means secured to be longitudinally moveable relative to the fixed lower track assembly with the second latch mechanism when the second latch mechanism is released without release of the first latch mechanism, but fixed in position relative to the fixed lower assembly for lateral pivotal movement relative to the fixed lower track assembly to engage the lower track assembly to memorize the initial position of securement of the second latch mechanism in the fixed lower track when released by the forward movement of the first latch mechanism and thus the upper track assembly, which seat assembly permits the "sliding displacement" of components to provide ease of access, and sufficient access to behind the seat and particularly the back seat, providing a reliable "memory" for memorizing the front seat assembly's initial position prior to the front seat sliding forward and returns to its initial position irrespective of whether the upper track assembly or middle track assembly starts to return to the initial "stacked" or "stored" position first.

2. The seat assembly of claim 1, further comprising means carried by the middle track assembly released for movement by, the release and movement of the upper track assembly away from the rear end of the seat assembly after release of the first latch mechanism, and, by the release of the second latch mechanism from the lower track assembly by the forward movement to the front end of the first latch mechanism to thereby preclude the second latch mechanism from securing the middle track assembly to the fixed lower track assembly, the latch memory means being thereby released for memorizing the initial position of securement of the second latch mechanism after release of the first latch mechanism when the means for precluding the second latch mechanism from securing the middle track assembly to the fixed lower track assembly is positioned when the upper and middle track assemblies are released for movement, synchronization means and delay means for precluding the latch memory means from disengaging the fixed lower track assembly until the second latch mechanism is returned to its initial position securing the middle track assembly to the lower track assembly, the synchronization 17 means for engaging the means for precluding the second latch mechanism from securing the middle track assembly to the lower fixed track assembly and prevent such means from permitting the second latch mechanism securing the middle track assembly to the lower fixed track assembly until the synchronization means is returned to its initial position, and the delay means for engaging the latch memory means and precluding the disengagement thereof with the fixed lower track assembly until the synchronization means is returned to its initial position at which time the delay means is caused to be returned to its initial position thereby permitting the means precluding release of the second latch mechanism from securing the middle track assembly to the lower fixed track assembly to be moveable to release the second latch mechanism to secure the middle track assembly to the lower fixed track assembly, wherein the latch means provided is easily activated and will not readily dislodge from its "memorizing" position thus providing reliability, irrespective of which assembly returns first.

3. A seat assembly for permitting the front seat having a seat back at its rear end and a bottom, to be moved forwardly and returned to its initial position providing ease of access, and sufficient access, to behind the seat assembly and particularly to the back seat, "memorizing" the seat's initial position for return of the assembly of its initial position, the said seat assembly comprising:

(a) an upper track assembly secured to a seat bottom;
(b) a middle track assembly -and-
(c) a lower track assembly fixed to the vehicle body, the upper track assembly being releaseably secured to the middle track assembly for sliding with the middle assembly track and when released being slideable with respect to the middle track assembly and the middle track assembly being releaseably secured to the lower track assembly and when released being slideable with respect to the lower track assembly, the position of securement of the middle track assembly to the lower track assembly being variable for positioning the seat bottom relative to the vehicle body;

a first latch mechanism secured to the upper track assembly pivotably releasably secured to the middle track assembly;
the seat back being tiltable towards the front of the seat, the tilting of the back releasing the first latch mechanism from the middle track assembly thus releasing the upper track for slideable movement relative to the middle track, a second latch mechanism secured to the middle track assembly pivotally releaseably secured to the fixed lower track assembly, the first latch mechanism being disposed closer the rear end of the seat assembly than the second latch mechanism when the latch mechanisms are releaseably secured to the middle and lower track assemblies respectively, the first latch mechanism carrying means for engaging the second latch mechanism to release it from securement to the lower track assembly when the upper track assembly is released and moves away from the rear end of the seat assembly, means on the second latch mechanism to be engaged to the means carried on the first latch mechanism to cause the second latch mechanism to pivot to release the middle track assembly with respect to the lower track assembly, whereby when the upper track is moved forward it causes the middle track to be released for slideable forward following movement with respect to the lower track;

memory latch means secured to be longitudinally moveable relative to the fixed lower track assembly with the second latch mechanism when the second latch mechanism is released without release of the first latch mechanism, but fixed in position relative to the fixed lower assembly for lateral pivotal movement relative to the fixed lower track assembly to engage the lower track assembly to memorize the initial position of securement of the second latch mechanism in the fixed lower track when released by the forward movement of the first latch mechanism and thus the upper track assembly, for releaseably securing to the lower track assembly when the upper track assembly is released for slideable forward movement, to "memorize" the initial position of the seat assembly so that when the tracks are fully extended, the seat has been moved forwardly to a forward position to permit entry to behind the seat, and means carried by the middle track assembly released for movement by, the release and movement of the upper track assembly away from the rear end of the seat assembly after release of the first latch mechanism, and, by the release of the second latch mechanism from the lower track assembly by the forward movement to the front end of the first latch mechanism to thereby preclude the second latch mechanism from securing the middle track assembly to the fixed lower track assembly, the latch memory means being thereby released for memorizing the initial position of securement of the second latch mechanism after release of the first latch mechanism when the means for precluding the second latch mechanism from securing the middle track assembly to the fixed lower track assembly is positioned when the upper and middle track assemblies are released for movement, synchronization means and delay means for precluding the latch memory means from disengaging the fixed lower track assembly until the second latch mechanism is returned to its initial position securing the middle track assembly to the lower track assembly, the synchronization means for engaging the means for precluding the second latch mechanism from securing the middle track assembly to the lower fixed track assembly and prevent such means from permitting the second latch mechanism securing the middle track assembly to the lower fixed track assembly until the synchronization means is returned to its initial position, and the delay means for engaging the latch memory means and precluding the disengagement thereof with the fixed lower track assembly until the synchronization means is returned to its initial position at which time the delay means is caused to be returned to its initial position thereby permitting the means precluding release of the second latch mechanism from securing the middle track assembly to the lower fixed track assembly to be moveable to release the second latch mechanism to secure the middle track assembly to the lower fixed track assembly, whereby when the seat is pushed rearwardly the upper and middle track assemblies are returned to their initial positions irrespective of whether the upper track assembly or middle track assembly starts to return to the initial stacked position first.

4. The seat assembly of claim 3, wherein the tilting of the seat back pulls a wire releasing the first latch mechanism permitting slideable relative movement of the upper track assembly with respect to the middle track assembly.

5. The seat assembly of claim 3, wherein each latch mechanism includes a tooth for engaging with its associated track assembly and the tooth of the second latch mechanism is held out of engagement with the lower track assembly by the rotation of the means carried by the middle track assembly released for movement by, the release and movement of the upper track assembly away from the rear end of the seat assembly after release of the first latch, the rear end of the seat assembly after release of the first latch mechanism, and, by the release of the second latch mechanism from the lower track assembly by the forward movement to the front end of the first latch mechanism to thereby preclude the second latch mechanism from securing the middle track assembly to the fixed lower track assembly and wherein said last means comprises a lever to block the entry of the tooth of the second latch mechanism into a notch or slot of the lower track assembly as the memory latch means "memorizes" the initial position of the seat assembly.

6. The seat assembly of claim 5, wherein the memory latch means memorizes the initial position of the seat assembly by a tooth carried by the memory latch means engaging a notch or slot in the lower track.

7. A seat assembly having a front and a rear end comprising at least three track assemblies, —a fixed lower track assembly, a middle or second track assembly releaseably secured to the fixed lower track assembly and when released being slideable with respect to the lower track assembly and an upper track assembly releaseably secured to the middle track assembly and thus the lower track assembly and when released being slideable with respect to the middle track assembly and thus the lower track assembly—including a first latch mechanism secured to the upper track assembly pivotally secured to the middle or second track assembly for releaseably securing the upper track assembly to the middle track assembly a second latch mechanism secured to the middle track assembly pivotally secured to the lower track assembly for releaseably securing the middle track assembly to the lower track assembly, the first latch mechanism being disposed closer the rear end of the seat assembly than the second latch mechanism when the latch mechanisms are releaseably secured to the middle and lower track assemblies respectively, the first latch mechanism carrying means for engaging the second latch mechanism to release it from securement to the lower track assembly when the upper track assembly is released and moves away from the rear end of the seat assembly, means on the second latch mechanism to be engaged by the means carried on the first latch mechanism to cause the second latch mechanism to pivot to release the middle track assembly with respect to the lower track assembly, carrying means for engaging the second latch mechanism and latch memory means for memorizing the initial position of the middle assembly relative to the lower track assembly, latch memory means secured to be longitudinally moveable relative to the fixed lower track assembly with the second latch mechanism when the second latch mechanism is released without release of the first latch mechanism, but fixed in position relative to the fixed lower assembly for lateral pivotal movement relative to the fixed lower track assembly to engage the lower track assembly to memorize the initial position of securement of the second latch mechanism in the fixed lower track when released by the forward movement of the first latch mechanism and thus the upper track assembly, which seat assembly permits the "sliding displacement" of components to provide ease of access, and sufficient access to behind the seat and particularly the back seat, providing a reliable "memory" for memorizing the front seat assembly's initial position prior to the front seat sliding forward and returns to its initial position irrespective of whether the upper track assembly or middle track assembly starts to return to the initial "stacked" or "stored" position first.

8. The seat assembly of claim 7, further comprising means carried by the middle track assembly released for movement by, the release and movement of the upper track assembly away from the rear end of the seat assembly after release of the first latch mechanism, and, by the release of the second latch mechanism from the lower track assembly by the forward movement to the front end of the first latch mechanism to thereby preclude the second latch mechanism from securing the middle track assembly to the fixed lower track assembly, the latch memory means being thereby released for memorizing the initial position of securement of the second latch mechanism after release of the first latch mechanism when the means for precluding the second latch mechanism from securing the middle track assembly to the fixed lower track assembly is positioned when the upper and middle track assemblies are released for movement, synchronization means and delay means for precluding the latch memory means from disengaging the fixed lower track assembly until the second latch mechanism is returned to its initial position securing the middle track assembly to the lower track assembly, the synchronization means for engaging the means for precluding the second latch mechanism from securing the middle track assembly to the lower fixed track assembly and prevent such means from permitting the second latch mechanism securing the middle track assembly to the lower fixed track assembly until the synchronization means is returned to its initial position, and the delay means for engaging the latch memory meand and precluding the disengagement thereof with the fixed lower track assembly until the synchronization means is returned to its initial position at which time the delay means is caused to be returned to its initial position thereby permitting the means precluding release of the second latch mechanism from securing the middle track assembly to the lower fixed track assembly to be moveable to release the second latch mechanism to secure the middle track assembly to the lower fixed track assembly, wherein the latch means provided is easily activated and will not readily dislodge from its "memorizing" position thus providing reliability, irrespective of which assembly returns first.

9. A seat assembly having a front and a rear end comprising three track assemblies, a fixed lower track assembly, a middle or second track assembly releaseably secured to the lower track assembly, and when released, being slideable to the front end with respect to the lower track assembly, and an upper or third track assembly releaseably secured to the middle track assembly, and when released, being slideable to the front end with respect to the middle track assembly, a first latch mechanism secured to the upper assembly pivotably releaseably secured to the middle track assembly, means secured to the first latch mechanism secured to the upper track assembly to release the first latch mechanism from securement with the middle or second track assembly, a second latch mechanism secured to the middle track assembly pivotally releaseably secured to the fixed lower track assembly, the first latch mechanism being disposed closer the rear end of the seat assembly than the second latch mechanism when the latch mechanisms are releaseably secured to the middle and lower track assemblies respectively, the first latch mechanism carrying means for engaging the second latch mechanism to release it from securement to the lower track assembly when the upper track assembly is released and moves away from the rear end of the seat assembly, means on the second latch mechanism to be engaged by the means carried on the first latch mechanism to cause the second latch mechanism to pivot to release the middle track assembly with respect to the lower track assembly, latch memory means secured to be longitudinally moveable relative to the fixed lower track assembly with the second latch mechanism when the second latch mechanism is released without release of the first latch mechanism, but fixed in position relative to the fixed lower assembly for lateral pivotal movement relative to the fixed lower track assembly to engage the lower track assembly to memorize the initial position of securement of the second latch mechanism in the fixed lower track when released by the forward movement of the first latch mechanism, and thus the upper track assembly, means carried by the middle track assembly released for movement by, the release and movement of the upper track assembly away from the rear end of the seat assembly after release of the first latch mechanism, and, by the release of the second latch mechanism from the lower track assembly by the forward movement to the front end of the first latch mechanism to thereby preclude the second latch mechanism from securing the middle track assembly to the fixed lower track assembly, the latch memory means being thereby released for memorizing the initial position of securement of the second latch mechanism after release of the first latch mechanism when the means for precluding the second latch mechanism from securing the middle track assembly to the fixed lower track assembly is positioned when the upper and middle track assemblies are released for movement, synchronization means and delay means for precluding the latch memory means from disengaging the fixed lower track assembly until the second latch mechanism is returned to its initial position securing the middle track assembly to the lower track assembly, the synchronization means for engaging the means for precluding the second latch mechanism from securing the middle track assembly to the lower fixed track assembly and prevent such means from permitting the second latch mechanism securing the middle track assembly to the lower fixed track assembly until the synchronization means is returned to its initial position, and the delay means for engaging the latch memory means and precluding the disengagement thereof with the fixed lower track assembly until the synchronization means is returned to its initial position at which time the delay means is caused to be returned to its initial position thereby permitting the means precluding release of the second latch mechanism from securing the middle track assembly to the lower fixed track assembly to be moveable to release the second latch mechanism to secure the middle track assembly to the lower fixed track assembly, whereby the seat assembly permits "sliding" displacement of components to provide ease of access and sufficient access to behind the seat assembly, providing a reliable "memory" for memorizing the seat assembly's initial position prior to the seat sliding forward, and returns to its initial position irrespective of whether the upper track assembly or middle track assembly starts to return to the initial position first.

* * * * *

UNITED STATES PATENT AND TRADEMARK OFFICE
CERTIFICATE OF CORRECTION

PATENT NO. : 4,652,052

DATED : March 24, 1987

INVENTOR(S) : Alfred Hessler and Andrzej Bartczak

It is certified that error appears in the above-identified patent and that said Letters Patent is hereby corrected as shown below:

In column 3 at line 64 after 'being' and before 'to', the word "releasably" has been deleted and ---releaseably secured by a latch mechanism--- substituted therefor.

In column 6 of the Patent at line 10, after 'released.' and before "according', the phrase ---on the one side.--- has been inserted;

In column 6 at line 10, a new paragraph has been started at 'According';

In column 9 at line 61 after 'and' and before 'Similarly, the number "552A." has been deleted and ---52A.--- inserted therefor;

In column 13 at line 42 after '5' and before '6', a ---,--- has been inserted;

In column 14 at line 51 after 'removed' and before '.', a ---)--- has been inserted;

In column 17 at line 33, the phrase "away from the rear end of the seat assembly" has been deleted;

UNITED STATES PATENT AND TRADEMARK OFFICE
CERTIFICATE OF CORRECTION

PATENT NO. : 4,652,052

DATED : March 24, 1987

INVENTOR(S) : Alfred Hessler and Andrzej Bartczak

It is certified that error appears in the above-identified patent and that said Letters Patent is hereby corrected as shown below:

In column 19 at line 55, after 'memory' and before 'and', the word "meand" has been deleted and ---means--- inserted therefor.

Signed and Sealed this

Seventeenth Day of November, 1987

Attest:

DONALD J. QUIGG

*Attesting Officer*  *Commissioner of Patents and Trademarks*